US008340980B2

(12) United States Patent
Cardno et al.

(10) Patent No.: US 8,340,980 B2
(45) Date of Patent: *Dec. 25, 2012

(54) DATA VISUALISATION SYSTEM AND METHOD

(75) Inventors: Andrew John Cardno, Wellington (NZ); Craig Ivan Soper, Wellington (NZ); Nicholas John Mulgan, Wellington (NZ); Patrick Nicholas Ryan, Wellington (NZ); Paul Alan Cardno, Wellington (NZ); Andreas Mahn, Wellington (NZ); Nichole Kaufmann, Wellington (NZ)

(73) Assignee: Bally Technologies, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/447,031

(22) Filed: Apr. 13, 2012

(65) Prior Publication Data

US 2012/0223963 A1 Sep. 6, 2012

Related U.S. Application Data

(63) Continuation of application No. 12/185,004, filed on Aug. 1, 2008, now Pat. No. 8,160,893, which is a continuation of application No. 10/910,963, filed on Aug. 4, 2004, now Pat. No. 7,668,726, which is a continuation of application No. 09/674,469, filed as application No. PCT/NZ00/00099 on Jun. 14, 2000, now abandoned.

(30) Foreign Application Priority Data

| Jun. 14, 1999 | (NZ) | ......................................... 336257 |
| Mar. 20, 2000 | (NZ) | ......................................... 503480 |
| May 3, 2000 | (NZ) | ......................................... 504315 |
| May 17, 2000 | (NZ) | ......................................... 504589 |

(51) Int. Cl.
*G06Q 10/00* (2006.01)

(52) U.S. Cl. ....................................................... 705/1.1

(58) Field of Classification Search ........................ None
See application file for complete search history.

(56) References Cited

U.S. PATENT DOCUMENTS

| 4,343,469 A | 8/1982 | Kunita et al. |
| 5,150,312 A | 9/1992 | Beitel et al. |
| 5,228,119 A | 7/1993 | Mihalisin et al. |
| 5,333,244 A | 7/1994 | Harashima |
| 5,689,431 A | 11/1997 | Rudow et al. |

(Continued)

FOREIGN PATENT DOCUMENTS

GB  2 233 197 A  1/1991

(Continued)

OTHER PUBLICATIONS www.esri.com, retrieved from Internet Archive Wayback Machine <www.archive.org>, Date Range: Feb. 15, 1998-Jul. 5, 1998.

(Continued)

*Primary Examiner* — Jonathan Ouellette
(74) *Attorney, Agent, or Firm* — Steptoe & Johnson LLP

(57) ABSTRACT

A data visualization system is disclosed that includes a data value memory, a display, and contour generator. The data value memory maintains a finite set of data values. The display is arranged to display a representation of each data value centered on respective data points. The contour generator is arranged to generate and display a representation having a cross-sectional shape of a bell-shaped curve in which each data point is displayed as an apex of the bell-shaped curve. Also disclosed is a method of data visualization and a data visualization computer program.

32 Claims, 26 Drawing Sheets

U.S. PATENT DOCUMENTS

| | | | |
|---|---|---|---|
| 5,796,932 | A | 8/1998 | Fox et al. |
| 5,920,325 | A | 7/1999 | Morgan et al. |
| 5,966,672 | A | 10/1999 | Knupp |
| 5,983,220 | A | 11/1999 | Schmitt |
| 6,211,887 | B1 | 4/2001 | Meier et al. |
| 6,232,984 | B1 | 5/2001 | Chuah et al. |
| 6,282,547 | B1 | 8/2001 | Hirsch |
| 6,366,280 | B1 | 4/2002 | Allen et al. |
| 6,389,154 | B1 | 5/2002 | Stam |
| 6,404,432 | B1 | 6/2002 | Simpson |
| 6,466,211 | B1 | 10/2002 | Havre et al. |
| 6,470,383 | B1 | 10/2002 | Leshem et al. |

FOREIGN PATENT DOCUMENTS

| | | |
|---|---|---|
| WO | WO 96/29619 | 9/1996 |
| WO | WO 97/13210 | 4/1997 |

OTHER PUBLICATIONS www.mapinfo.com, Screen Print, Jan. 25, 1999.
"Mapinfo 3.0: GIS for the Masses?" VARbusiness, p27, Nov. 1994.
"First Location Centric Business Intelligence Application Debuts Utilizing Informiz and Mapinfo Technology." Business Wire, Jan. 20, 1999.
www.microsoft.com/mappoint/, Screen Print, May 8, 1999.
"Microsoft MapPoint 2000 Delivers New Mapping and Analysis Program." PR Newswire, Nov. 3, 1998.
"Microsoft MapPoint 2000 Released to Manufacturing." PR Newswire, Apr. 14, 1999.
Patz, Joel T., "You Are Here . . . and Your Clients Are There." Home Office Computing, Jun. 1999.
Wells, Amanda, "Aussie firm maps out NZ data," Infotech Weekly, 2ed, p22, May 31, 1999.
Hucke, Mark, "Compudigm software puts NZ on the map for fishing boats," InfoTech Weekly, p8, Feb. 15, 1999.
"IMSI Announces MapLinx Professional v5—The Power to Visualize Data; Instantly Map Client, Prospect, Sales, Marketing or Other Business Data for Geographic and Demographic Analysis." Business Wire, Feb. 18, 1998.
"Visual Insights Releases New Decision Support Application." Telecomworldwire, May 11, 1999.
"IBM takes high road to visualization," Electronic Engineering Times, p1, Jul. 29, 1991.
"Gaming Solutions", Compudigm International Limited (4 pgs); Mar. 2000.
Finnimore, Ian, "GIS You can bet on—Spatially Analyzing Casino Action", Geospatial Solutions (4 pgs); Jun. 2000.
Reese, Shelly, "Loading the Dice", www.marketingclick.com (4 pgs); Jun. 1998.
Duffy, Dainty, "Mapping Your Success", CIO Online, www.cio.idg.com.au (7 pgs); Mar. 22, 1999.
Hammond, Mark, "Bally Software firm picks GIS as Winner on Casino Floor", eWEEK (2 pgs); Jan. 3, 1999.
"Mapping Gamblers", Spatial Business (1 pg); Spring 1999.
"The Ultimate Casino Management System", Compudigm International (3 pgs); Oct. 1999.
Quinn, William, "Tracking the future", Casino Journal (pp. 72-75); Dec. 1999.
"Networks and Servers", Compudigm International Limited (1 pg); 1999 flyer.
"SeePower Architecture", Compudigm International Limited (1 pg); 1999 flyer.
"Key Elements of Solution", Compudigm International Limited (1 pg); 1999 flyer.
"A picture paints a thousand words", Compudigm International Limited (1 pg); 1999 flyer.
"Compudigm Profile Retailing and Gaming", Compudigm International Limited (1 pg); 1999 flyer.
"Compudigm Value Chain", Compudigm International Limited (1 pg); 1999 flyer.
"Bank Contouring and Machine Shading", Compudigm International Limited (1 pg); 1999 flyer.
"Compudigm Gaming Value Proposition", Compudigm International Limited (4 pgs); Jan. 25, 2000.
"Tactician Corporation Announces the release of Tactician 4.1, the Industry's Most Advanced Micro-Marketing and Business Mapping Engine." Business Wire, Feb. 17, 1998.

| ID | GAME ID | POSSESSION | TIME | x | y | HALF |
|---|---|---|---|---|---|---|
| 1480 | 670 | 1 | 12/30/99 12:15:46 | 1.23101 | 28.9773 | 1 |
| 1481 | 670 | 1 | 12/30/90 12:15:46 | 1.2213 | 29.7605 | 1 |
| 1482 | 670 | 1 | 12/30/99 12:15:47 | 1.6381 | 30.6149 | 1 |

FIG. 34

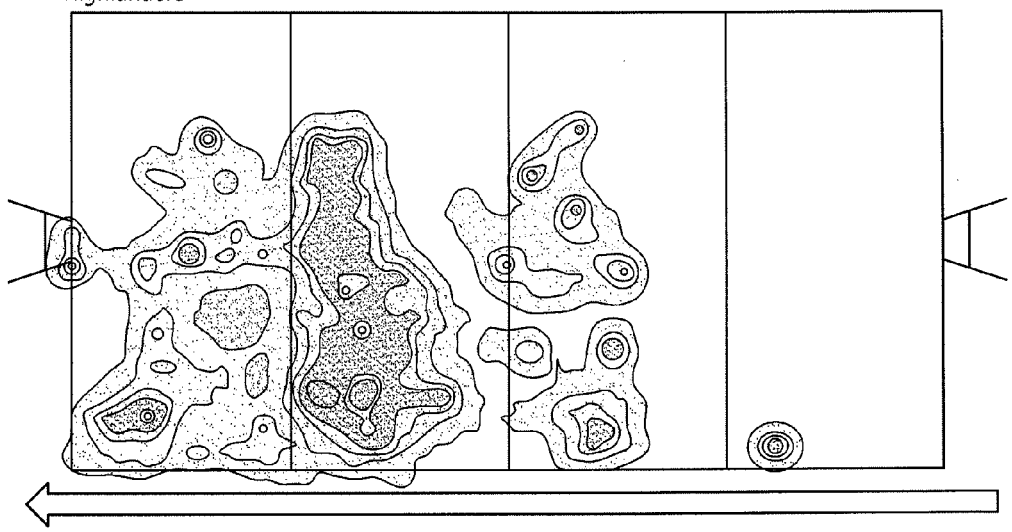
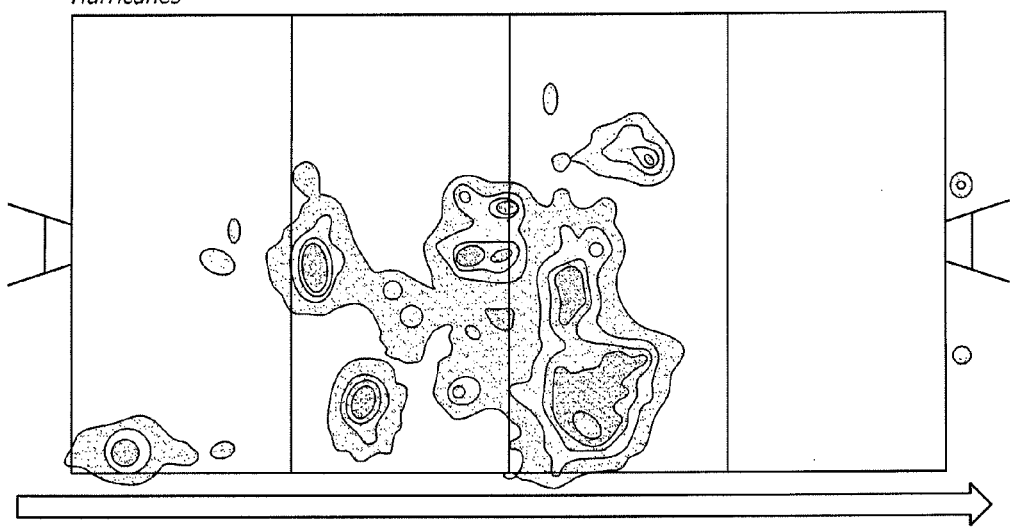
FIG. 36

Example: for entire team, backs or forwards.
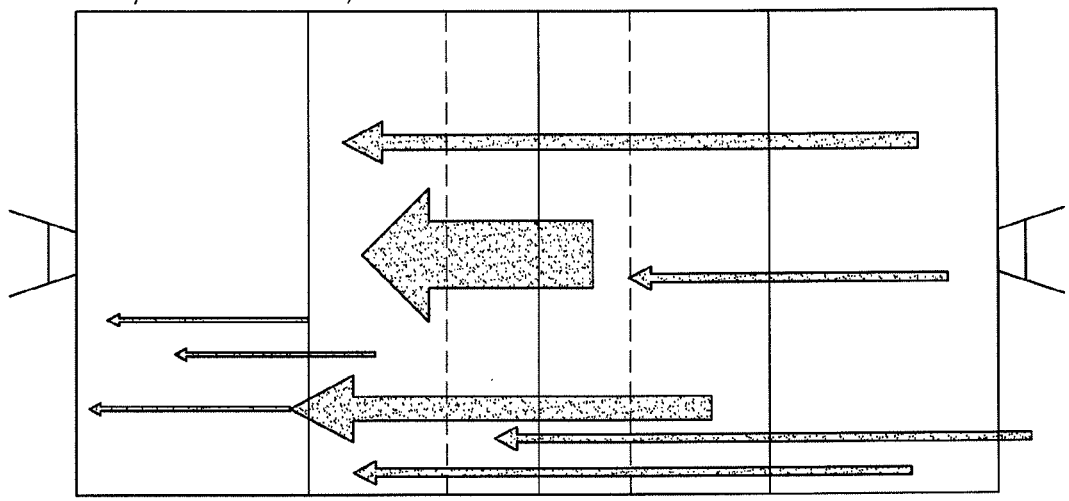
Example: for backs
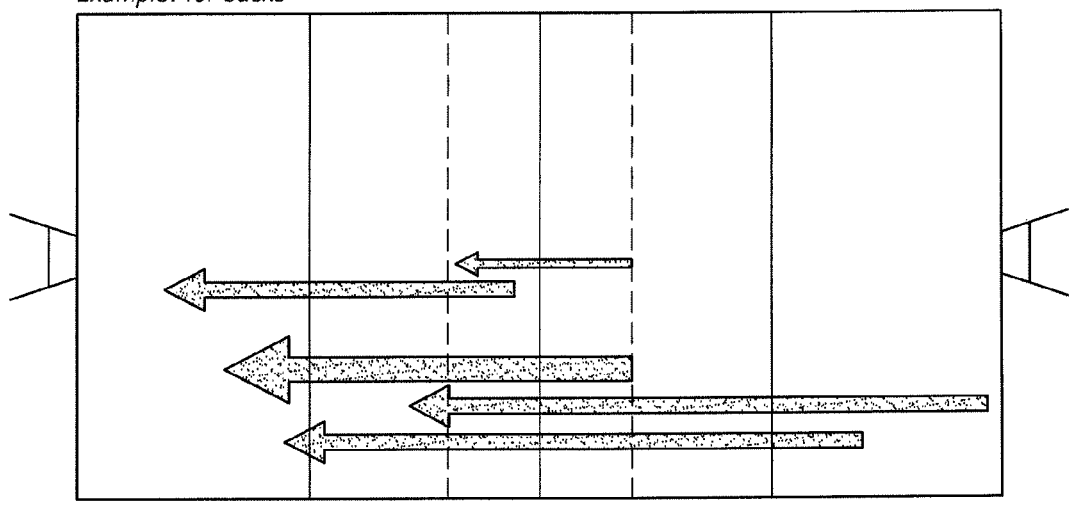
FIG. 37

DATA VISUALISATION SYSTEM AND METHOD

CROSS-REFERENCE TO RELATED APPLICATIONS

This application is a continuation of U.S. patent application Ser. No. 12/185,004, filed Aug. 1, 2008, which is a continuation of U.S. application Ser. No. 10/910,963, filed Aug. 4, 2004, now U.S. Pat. No. 7,668,726, issued Feb. 23, 2010, which is a continuation of U.S. patent application Ser. No. 09/674,469, filed Feb. 21, 2001, which claims the benefit of foreign priority under 35 U.S.C. 371 of PCT/NZ00/00099, filed Jun. 14, 2000, the disclosures of which are herein incorporated by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF DISCLOSURE

The disclosure relates to a data visualisation system and method.

BACKGROUND

The low cost of data storage hardware has led to the collection of large volumes of data. Merchants, for example, generate and collect large volumes of data during the course of their business. To compete effectively, it is necessary for a merchant to be able to identify and use information hidden in the collected data. This data could include shop floor sales, and where the merchant operates a website, the use that is made of a website may also be collected. The task of identifying this hidden information has proved very difficult for merchants.

It is also important for other individuals and organisations to analyse stored data. Each time a game of sport is played, there is generally a large volume of data collected. For example, a game of rugby union generates statistics such as total number of points scored, the number of tries scored and the number of tries scored which are then converted. There is an increasing trend toward analysis of collected data with a view to analysing opponent strategies and as a coaching aid in assessing the strengths and weaknesses of a particular team. It is also especially desirable with televised sports to present the collected data to spectators in a form which is easily interpreted.

Traditionally, analysis of data has been achieved by running a query on a set of data records stored in a database. The merchant or other party first creates a hypothesis, converts this hypothesis to a query, runs the query on the database, and interprets the results obtained with respect to the original hypothesis.

One disadvantage of this verification-driven hypothesis approach is that the merchant must form the desired hypothesis in advance. This is merely confirming what the merchant already suspects and does not provide the merchant with information which may be unexpected. Another disadvantage is that the merchant needs to have available the technical knowledge to formulate the appropriate queries.

SUMMARY

In broad terms in one form the invention comprises a data visualisation system comprising a data value memory in which is maintained a finite set of data values; and display means arranged to display a contoured representation wherein one or more of the data values are displayed as contours around one or more data points, each data value centred on a data point.

In another form in broad terms the invention comprises a method of data visualisation comprising the steps of: maintaining in a data value memory a finite set of data values; and displaying a contoured representation wherein one or more of the data values are displayed as contours around one or more data points, each data value centred on a data point.

In another form in broad terms the invention comprises a data visualisation computer program comprising a finite set of data values maintained in a data value memory; and display means arranged to display as contoured representation wherein one or more of the data values are displayed as contours around one or more data points, each data value centred on a data point.

BRIEF DESCRIPTION OF THE DRAWING

Preferred forms of the data visualisation system and method will now be described with reference to the accompanying figures in which:

FIG. 34 is a preferred form database schema for representing sports data;

FIGS. 36 to 38 show further preferred form representations involving sports data;

DETAILED DESCRIPTION OF PREFERRED FORMS

Figure 1:
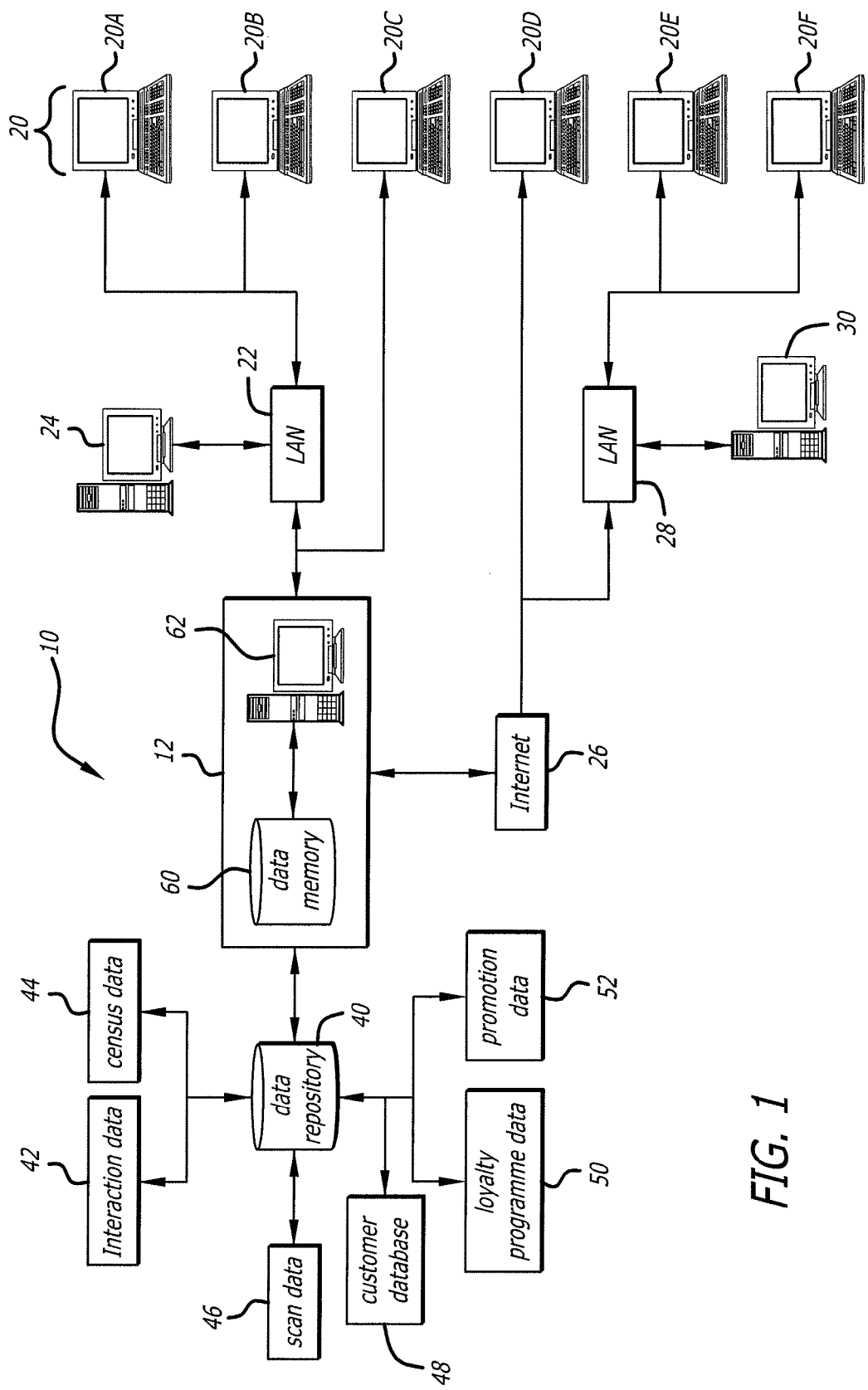
FIG. 1 shows a block diagram of a system in which one form of the invention may be implemented.

FIG. 1 illustrates a block diagram of the preferred system in which one form of the present invention 12 may be implemented. The system includes one or more clients 20, for example 20A, 20B 20C, 20D, 20E and 20F, which each may comprise a personal computer or workstation described below. Each client 20 is interfaced to the invention 12 as shown in FIG. 1. Each client 20 could be connected directly to the invention 12, could be connected through a local area network or LAN, or could be connected through the Internet.

Clients 20A and 20B, for example, are connected to a network 22, such as a local area network or LAN. The network 22 could be connected to a suitable network server 24 and communicate with the invention 12 as shown. Client 20C is shown connected directly to the invention 12. Clients 20D, 20E and 20F are shown connected to the invention 12 through the Internet 26. Client 20D is shown as connected to the Internet 26 with a dial-up connection and clients 20E and 20F are shown connected to a network 28 such as a local area network or LAN, with the network 28 connected to a suitable network server 30.

The preferred system 10 further comprises a data repository 40, for example a data warehouse maintained in a memory. It is envisaged that the data repository may alternatively comprise a single database, a collection of databases, or a data mart. The preferred data repository 40 includes data from a variety of sources. The data repository may include, for example, interaction data 42 representing interactions between customers and merchants as will be more particularly described below. The data repository may also include data from other sources for example census data 44, scan data 46 obtained from scanning bar-codes on products, data from merchant customer databases 48, data from merchant loyalty programmes 50 and/or promotion data 52 held by a merchant or other organisation.

One preferred form of the invention 12 comprises a personal computer or workstation operating under the control of appropriate operating and application software having a data memory 60 connected to a server 62. The invention is arranged to retrieve data from the data repository 40, process the data with the server 62 and to display the data on a client workstation 20, as will be described below.

Figure 2:
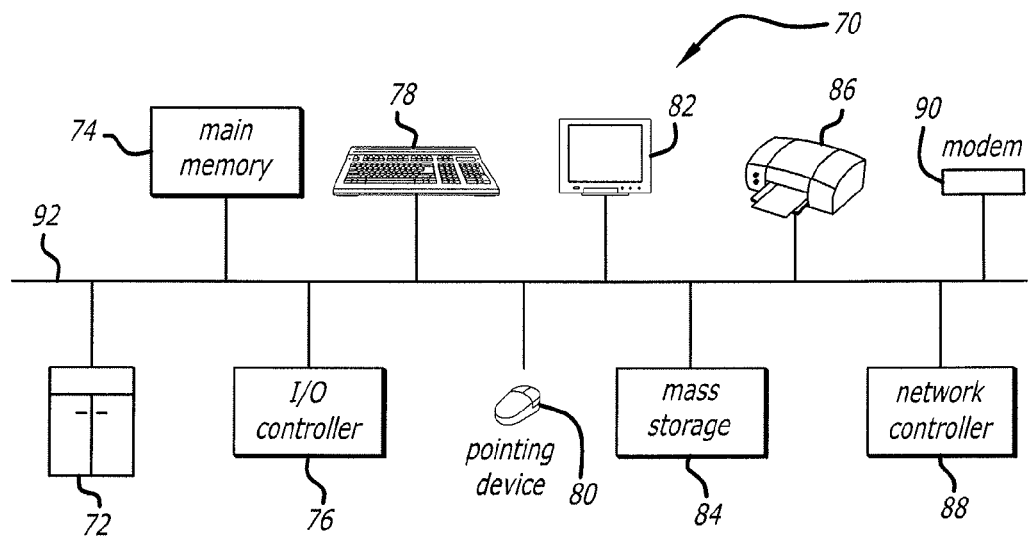
FIG. 2 shows the preferred system architecture of hardware on which the present invention may be implemented.

FIG. 2 shows the preferred system architecture of a client 20 or invention 12. The computer system 70 typically comprises a central processor 72, a main memory 74 for example RAM and an input/output controller 76. The computer system 70 also comprises peripherals such as a keyboard 78, a pointing device 80 for example a mouse, a display or screen device 82, a mass storage memory 84 for example a hard disk, floppy disk or optical disc, and an output device 86 for example a printer. The system 70 could also include a network interface card or controller 88 and/or a modem 90. The individual components of the system 70 could communicate through a system bus 92.

It is envisaged that the invention have a wide area of application and the nature and format of the data stored in the data repository 40 will be different for each application. Different applications of the invention are set out below. In each case, the invention 12 is arranged to display a contoured representation of data on a screen display of a client workstation 20.

Figure 3:
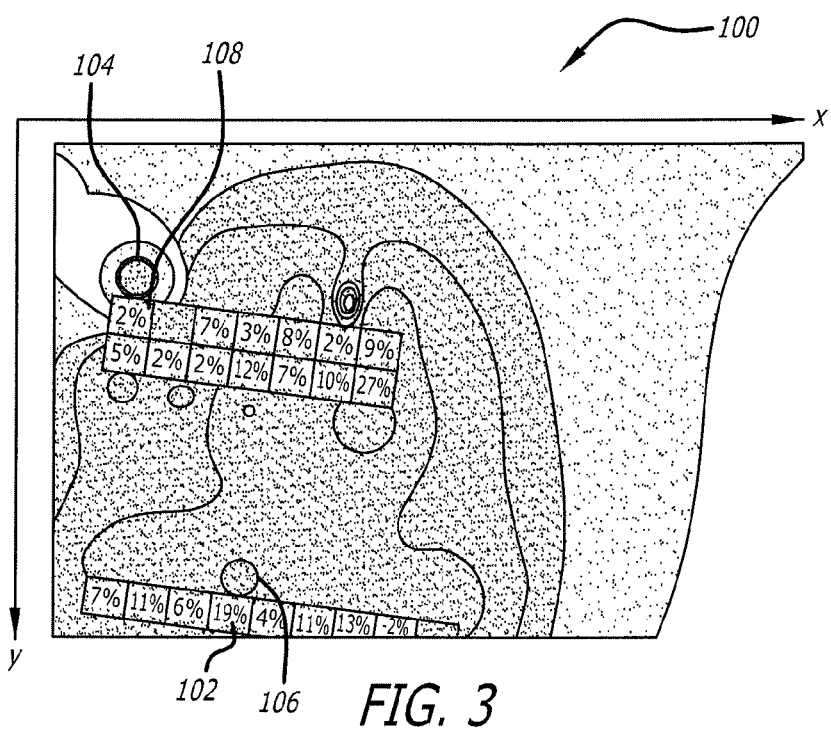
FIG. 3 is a preferred representation generated in accordance with the invention.

FIG. 3 illustrates at 100 one example of a display generated by the system where the merchant operates a casino or similar gaming venue. In this example, a representation of the merchant is generated and displayed. The graphical representation comprises a spatial representation of an area of the casino showing the layout of individual gaming machines and stations, two of which are indicated at 102 and 104 respectively. It will be appreciated that the particular representation generated will be varied according to the nature of the data represented, as will be described below.

The representation 100 is arranged to display the revenue obtained from an individual gaming machine. The revenue for each machine is preferably graphically represented adjacent or near to the representation of the individual machine. There are a finite number of machines in the casino, and the individual revenues generated from each machine represent a finite set of data values. These data values are graphically illustrated as data points in the representation 100. For example, the revenue or data value for machine 102 is graphically illustrated as data point 106 and the data value or revenue for machine 104 is graphically illustrated as data point 108.

The preferred representation 100 is colour coded and the value of revenue of each machine is illustrated by representing the corresponding data points in the appropriate colour to represent the correct value of revenue of each machine. The areas of the representation 100 around each data point are shown as contours. The nature of the contours for each data point are preferably represented to gradually drop off or fall away from each data point. Each data point could be represented by X and Y co-ordinates indicating the relative position of each data point in the representation. Each data point could also have a Z value representing the height or magnitude of the data point. This Z value could indicate, for example, the revenue or data value at a particular data point. Each data value is therefore centred on a data point.

Figure 4:
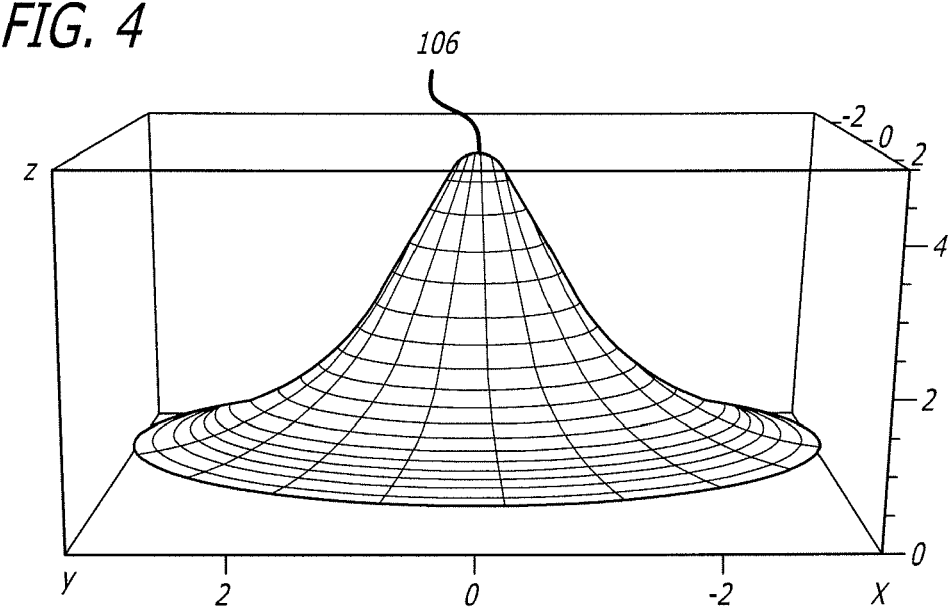
FIG. 4 is one view of a data point from the presentation of FIG. 3.

FIG. 4 illustrates a typical data point, for example data point 106. The data value of the data point represents the apex of a bell-shaped curve. As X and Y values in the representation 100 are increased or decreased, the Z value at the new position in the representation will change.

Figure 5:
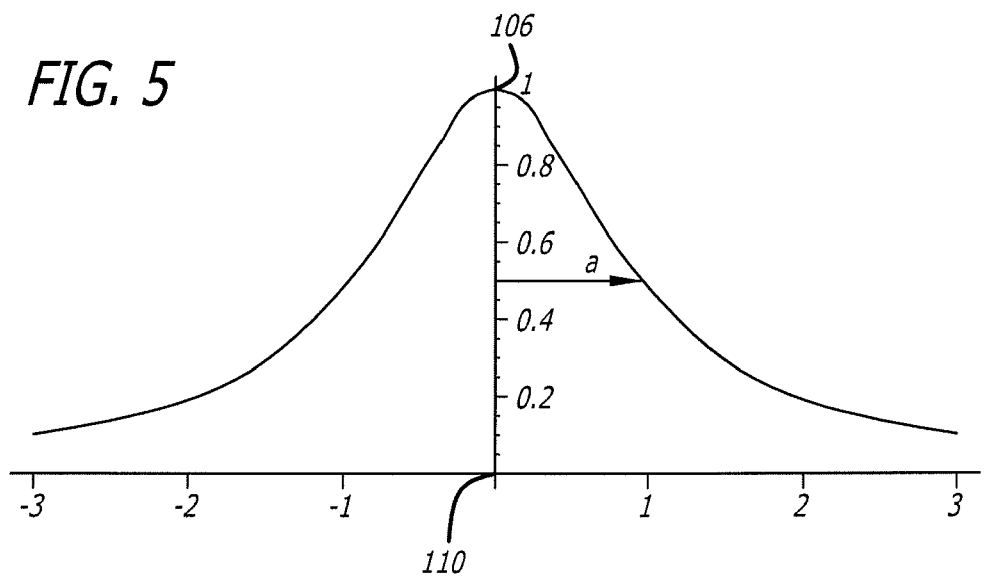
FIG. 5 is a further view of the data point of FIG. 4.

Referring to FIG. 5, data point 106 has an axis 110 and a maximum value at that axis. At a distance r from the axis 110, the drop in Z value is preferably calculated by the following drop-off function:

$$f(r) = \frac{1}{1+(r/a)}p$$

The value of p is preferably 2 or 3. As the value of p is increased, the data point is represented having a steeper shoulder and a flatter peak with steeper walls.

The value of a defines the horizontal distance between the axis 110 and the point of maximum drop-off of the resulting curve, which in practice defines the width of the contoured "hill." The value of a could be, for example, the point of "half height" of the value. Small values of a will result in fine detail in a contoured representation and larger values of a will result in a less detailed representation.

Figure 6:
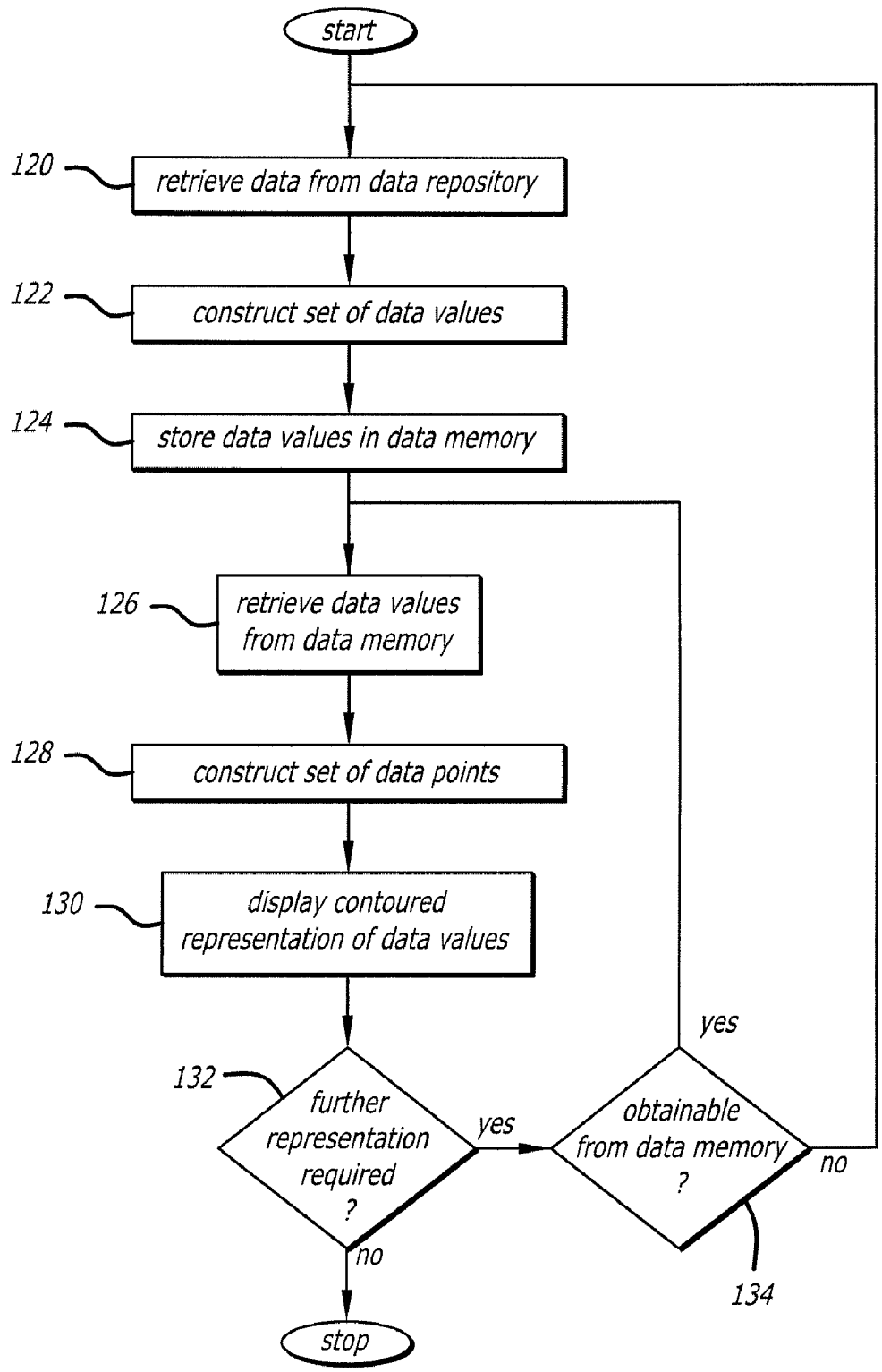
FIG. 6 is a flowchart of a preferred form of the invention.

FIG. 6 illustrates the preferred method of operation of the invention 12. As shown at 120, data is retrieved from the data repository 40 using a suitable query. The retrieved data could include data representing interactions between customers and merchants, where this data is stored in the data repository 40. The retrieved data could include the revenue generated by a set of gaming machines over a specified period.

As shown at 122, a set of data values is constructed from the retrieved data. This set of data values could include for example, revenue values generated by a set of gaming machines over a trading period.

It is envisaged that the set of data values could be stored in data value memory 60 to increase efficiency of the system as indicated at 124, which could comprise volatile main RAM or non-volatile mass storage of the work station on which the invention 12 is implemented.

Referring to step 126, the set of data values are retrieved from the volatile or non-volatile data memory and as shown at 128, a set of data points is constructed to represent the data values. Appropriate X and Y values are generated for each data point to space the data points over a generated representation. Z values for each data point are also calculated based on individual data values.

Referring to step 130, a contoured representation of the data values is generated and displayed on a client workstation 20. The individual drop-off for each data point is calculated and displayed in the appropriate colour and shading corresponding to the Z value at each point.

It is envisaged that the invention generate individual displays of contoured representations. It is also envisaged that the invention generate animated sequences of representations by generating two or more "still" representations at various time interval's and superimposing successive representations over earlier representations to generate an animated sequence.

As indicated at 132, where such an animated sequence is required, further representations will be needed and if the necessary data is obtainable from the data memory as indicated at 134, it is retrieved from the data memory as indicated at 126, otherwise further data is retrieved from the data repository at 120.

In one form the invention is arranged to display data representing interactions between customers and merchants. Typically, a merchant will operate in a commercial premises or store from which a customer purchases goods or services. The merchant may, for example, operate a petrol station in one or more geographic locations. The merchant may alternatively operate a wagering or betting service, or operate a casino or other gaming facility in which a number of gaming machines and stations are positioned in one or more rooms at a common venue. The merchant may also operate a warehouse facility, manufacturing facility, car parking premises, telecommunications network or web site. The merchant may also offer a range of financial or insurance services.

The merchant does not necessarily need to operate from a commercial premises or store. For example, the merchant may operate from strategically placed machines for example vending machines or amusement machines. The merchant may also operate a mail order catalogue service, direct market goods or services, or operate from a website or other electronic medium. It will be appreciated that the nature of business of a merchant includes a wide range of activities.

As a customer interacts with a merchant, the interaction generates interaction data which is then migrated to the data repository 40. The interaction data could be stored in a number of records in a relational database. Each record may include a merchant identifier used to identify a particular merchant, and where a merchant operates from more than one geographic location, the merchant identifier or some other identifier included in the record may identify the geographic location in which the interaction occurs.

The record could also include a customer identifier. The merchant may, for example, issue an incentive-supported customer loyalty card which is then used by the customer during interactions with the merchant. The loyalty card preferably has stored on it a customer identifier and may have stored other data, for example residential address and family size of the customer. Such data is stored in loyalty programme database 50 and could be migrated to the data repository 40.

Where the merchant operates retail premises, the merchant may have installed apparatus for reading the bar codes of products sold. Alternatively, each product may be identified by a code assigned by the merchant which is recorded at the time of sale. Such data is stored in a scan database 46 and could be migrated to the data repository 40. In this way, the record may also include a suitable goods or services identifier, for example a product or service code to identify which goods or services were involved in the interaction.

The record may also include data such as the date and/or time at which the interaction between the customer and merchant took place and/or the cash value of the transaction.

The interaction data is migrated to the data repository 40, generally by way of daily updates or in real time. It is advantageous to cleanse, catalogue and validate the interaction data during migration of the data to the data repository, and this task could be performed by either the merchant or by a third party. Once stored in the data repository 40, the data could be linked to other sources of data for subsequent retrieval, for example the census data 44, scan data 46, data from the merchant customer database 48, data from a merchant loyalty programme 50 and/or promotion data 52 held by the merchant.

The data repository 40 could be maintained by a merchant or alternatively could be maintained by a third party. Updates to the data repository could be carried out by the merchant directly, or alternatively the merchant could provide batched data to a third party for updating the data. Alternatively, a third party could be entrusted with the task, of collecting the interaction data and migrating the data to the data repository.

Figure 7:
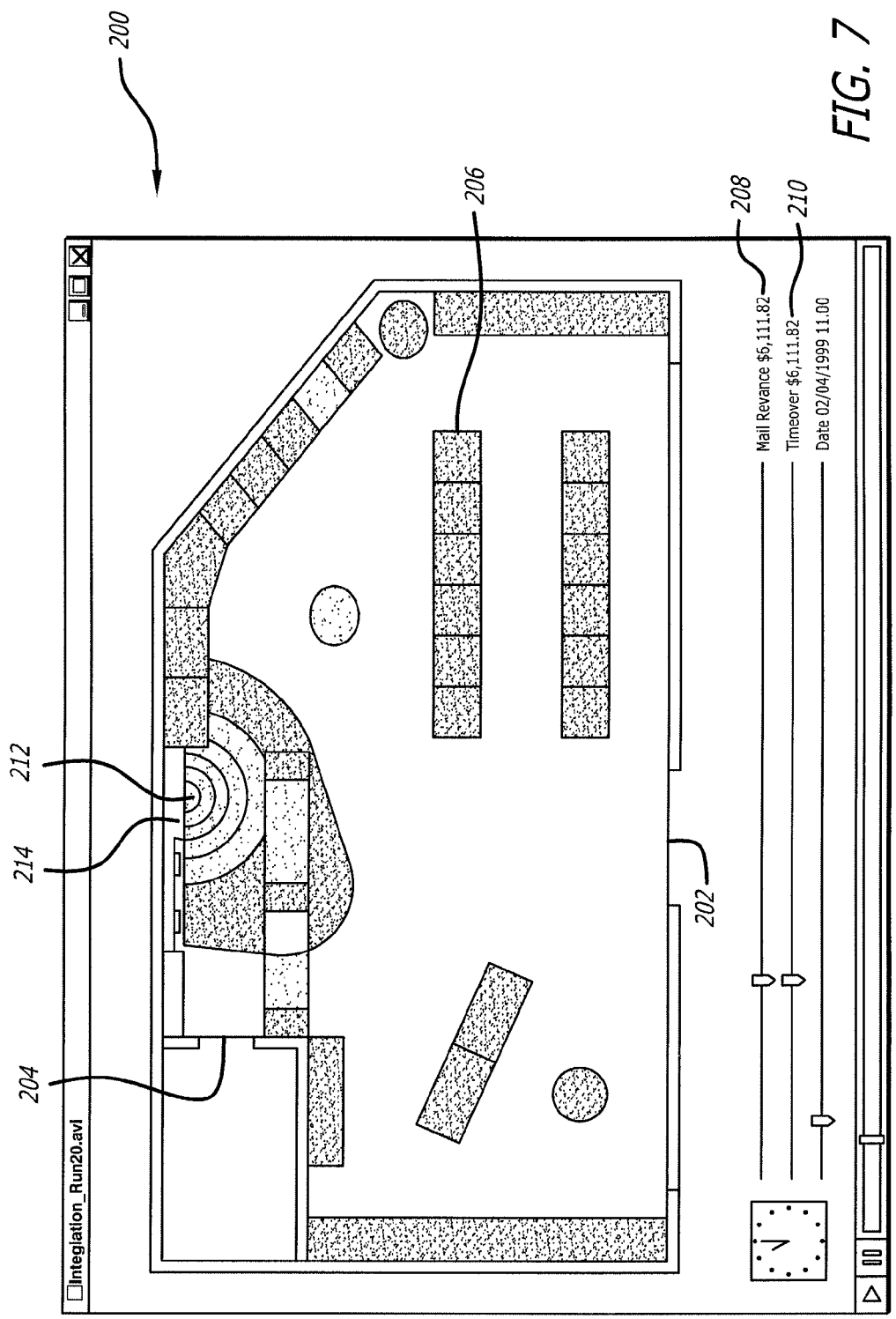
FIG. 7 is another preferred representation generated in accordance with the invention.

Referring to FIG. 7, a graphical representation of a merchant is generated and is displayed on the screen display of a client workstation 20. Where a merchant operates from a retail store, the graphical representation could include a graphical spatial representation of the store 200. The graphical representation 200 could show the position of the door 202, service counter and cash register 204, and a number of shelves 206 on which products are displayed. Where the merchant operates from two or more retail stores, the graphical representation could include spatial representations of each store and could also include a large scale map of the geographical area in which the merchant's stores are located.

Where a merchant operates a casino or similar gaming venue, the graphical representation could include a spatial representation of each individual room in the casino showing the layout of individual gaming machines and stations. The representation could also include a large scale representation of the entire premises showing smaller representations of individual rooms.

It will be appreciated that where a merchant operates a warehouse, the representations could show the layout of various goods stored by the merchant. Where the merchant provides services for example financial services, the representations could include schematic representations of the different areas of services offered by the merchant.

The invention is arranged to superimpose a representation of the data retrieved from the data repository 40 on the representation of the premises of the merchant. As shown in FIG. 7, the invention displays a representation of sales occurring during a predetermined period. Net revenue is indicated at 208 during the period and turnover during the same period is indicated at 210.

The preferred representation 200 is arranged to display to a user a number of key performance indicators (KPIs) in addition to or as an alternative to revenue and turnover. These KPIs may include, for example, sales, gross profit, net profit, gross margin return on inventory investment (GMROII), net margin return on inventory investment (NMROII), return on net asset (RONA), and/or loyalty sales data.

The preferred representation displays a contoured representation of a set of data values. The set of data values could comprise sales figures for individual products, gross profit on individual products, and so on. Each product group is represented as an individual data point and a contoured representation centred on each data point is generated. Data point 212, for example, represents tobacco sales and the data point is positioned adjacent the location of tobacco products in the store indicated at 214.

As described above, the invention could generate individual still representations such as that shown in FIG. 7. Alternatively, the invention could generate a series of representations at time intervals, for example hourly time intervals. By overlaying subsequent representations over earlier representations, the rate at which data values such as net revenue or turnover (image over a time period can be observed, and customer buying patterns are readily apparent.

The system may also overlay text over the spatial representation. For example, different shelves in the store or different products on the shelves may be identified by labels. Other labels could include the product selling price, product sales during the proceeding hour; or other information meaningful to the user.

A merchant operating a service station, for example, may identify from the above representations the periods in which sales of pies and other hot food is highest. By keeping warmers and shelves stocked in advance of these peak periods, the merchant can meet the demand of customers and reduce wastage.

The same merchant may also observe from the representations that sales of newspapers follow a similar pattern to sales of stamps. This may indicate to the merchant that sales of newspapers are correlated to sales of stamps. By positioning newspapers and stamps in close proximity to each other within the store, the merchant could increase sales of both products.

A merchant could initiate a promotional campaign in relation to a particular product and then identify the effectiveness of the campaign by viewing the representations generated by the system.

In another form of the invention, the merchant could comprise a telecommunications service provider operating a telecommunications network. The flexibility of mobile phones, their reducing cost, and the wide coverage now available has resulted in rapid growth in mobile phone use in many countries. A mobile phone user communicates with another mobile phone user by linking into a mobile phone network operated by the merchant. Mobile phone networks typically comprise one or more mobile phone sites which are small low powered radio transmitting and receiving stations. Each mobile site services a limited geographic area known as a cell. Each mobile site can only service a finite number of calls at any one time.

When a mobile phone is powered up, it generally searches for the strongest signal from a mobile site. The mobile phone is then registered as being located within the cell covered by that mobile site. When a mobile phone user leaves one cell and enters another, the new site covering the new cell takes over the phone call, enabling the communication to be maintained. This procedure is often referred to as "handover."

Figure 8:
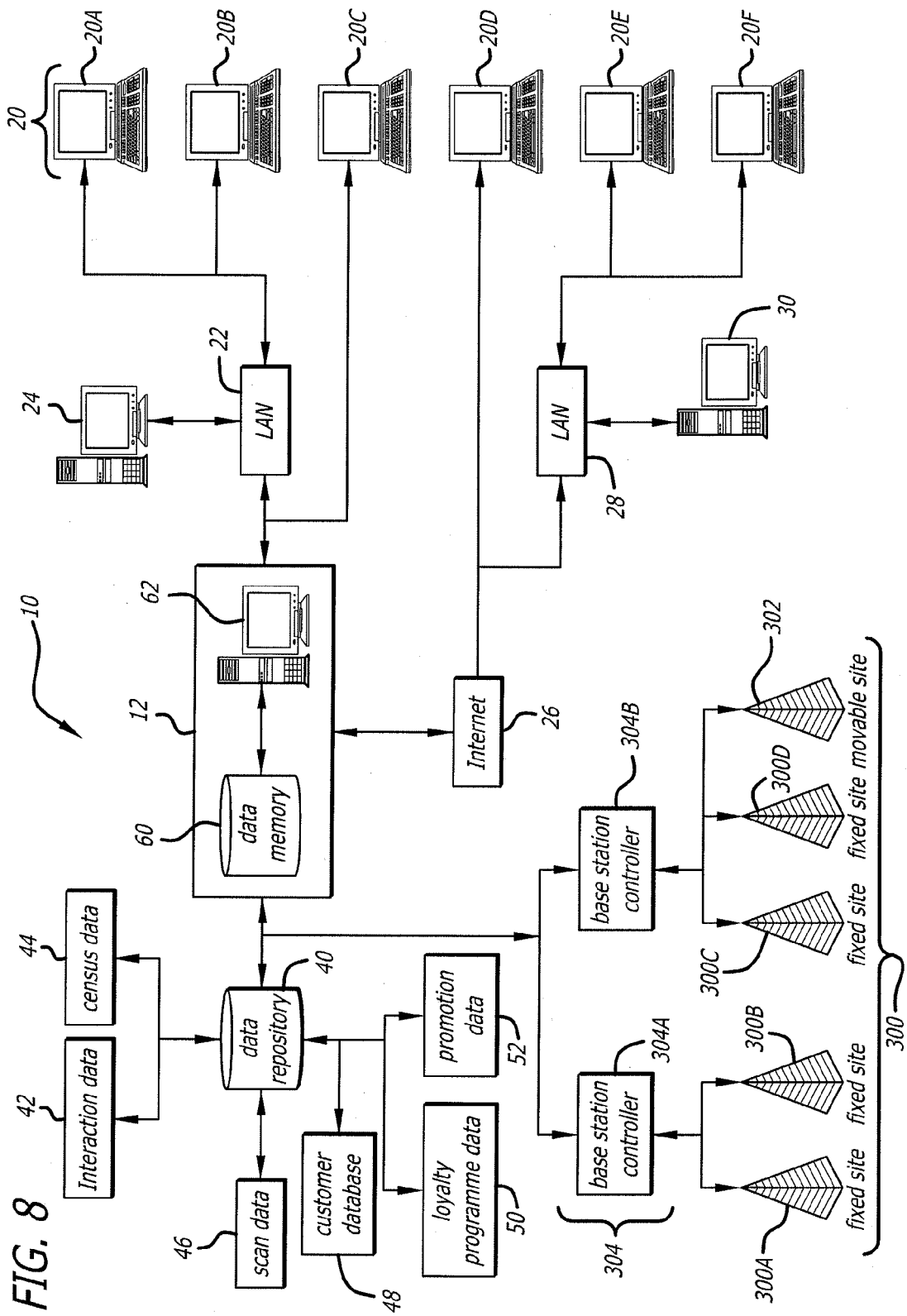
FIG. 8 shows a block diagram of a system in which another form of the invention may be implemented.

Referring to FIG. 8, the merchant's cellular network comprises one or more fixed mobile phone sites 300, for example 300A, 300B, 300C and 300D. Each site 300 preferably comprises a small low powered radio transmitting and receiving station or antenna which links a mobile phone user into the merchant's mobile phone network to connect or attempt to connect mobile phone users with each other.

The merchant may also operate movable sites, for example 302 which in turn could comprise omni-directional antennae mounted on trucks. Groups of sites 300 and 302 are preferably controlled by one or more base station controllers 304, for example 304A and 304B. Each controller is arranged to activate or deactivate individual sites as required and is also arranged to compile data representing the capacity and usage of individual sites. Each fixed site 300 and movable site 302 are preferably reconfigurable and connections between the sites and each controller 304 are also reconfigurable so that the merchant can activate or deactivate specific sites to reduce gaps in coverage, to reduce interference between sites, and to follow the demand around.

Data representing interactions between merchants and customers is preferably transferred by the base station controllers 304 to the data repository 40. Data is then retrieved from the data repository and processed with the server 62 in the manner described above. Preferably the data undergoes data staging where the data is scrubbed and/or cleaned and errors or anomalies are corrected.

The resulting data stored in the data repository 40 typically comprises one or more records. Each record may include, for example, a merchant identifier, a customer identifier, a cell and/or site identifier and other data such as the date and/or time at which the interaction between the customer and merchant took place.

The data may also include values of one or more key performance indicators or KPIs. Typical KPIs could include network capacity, the percentage of capacity used, call volume, average length of current calls and/or instances and rates of connection failure.

The data is preferably migrated to the data repository 40 by way of regular updates or in real time. The data repository could be maintained by a merchant or alternatively could be maintained by a third party. Updates to the data repository could be carried out by the merchant directly, or alternatively the merchant could provide batched data to a third party for updating the data repository. Alternatively, a third party could be entrusted with the task of collecting the interaction data from the base station controllers 304 and migrating the data to the data repository.

As described above, the data is displayed on a client workstation 20, preferably as a graphic representation of the data. Where the merchant operates a telecommunications network, the graphical representation could include a graphical spatial representation of the network represented by a collection of mobile sites, each site serving a geographic area or cell.

Figure 9:
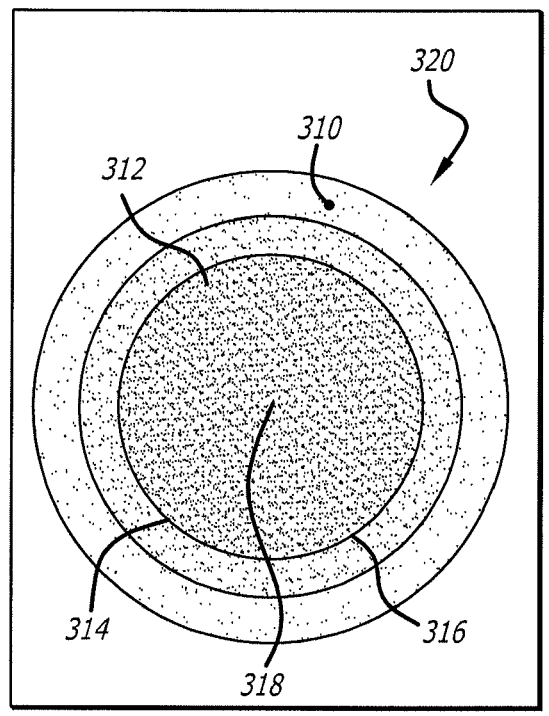
FIGS. 9 and 10 show preferred form representations generated in accordance with the invention.

FIG. 9 illustrates a typical graphical spatial representation 320 of the merchant. Site or cell locations are indicated for example at 310 and 312. The representation also shows one preferred form representation of the data retrieved from the data repository. The representation 320 preferably includes a series of contours representing the values of one or more key performance indicators or KPIs. The preferred representation 320 is arranged as contour lines around the site or cell locations in the spatial representation of the merchant.

In some circumstances, it is desirable to combine or aggregate customer interactions among two or more cells. Data relating to separate cells is often combined prior to or during data capture, resulting in the loss of some data. In these cases, it may be desirable to aggregate two or more cells. One preferred form aggregation method includes combining interactions involving cells 310, 312, 314, 316 and 318. The representation 320 is generated from a single data point located at cell 318.

Figure 10:
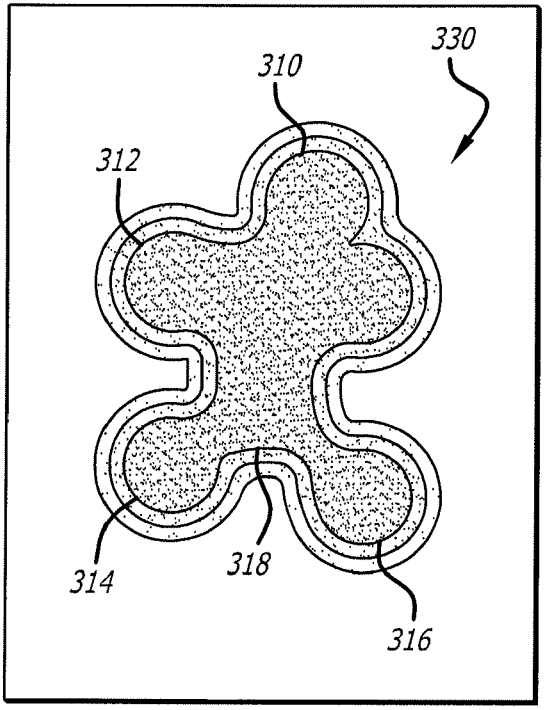

An alternative representation 330 is illustrated in FIG. 10. The KPI values of cells 310, 312, 314, 316 and 318 are aggregated and the average KPI value of these sites is then calculated. Contoured representation 330 is generated from a set of 5 data points, each data point centred on a respective site. Each data point has the average or mean value of the set of sites 310, 312, 314, 316 and 318.

Further preferred representations for displaying aggregated KPI site values are described with reference to FIGS. 11 to 15. In each case, the system is arranged to show part of a merchant's network, particularly the part of the network in use by customers located at a particular venue, for example a sports event.

Figure 11:
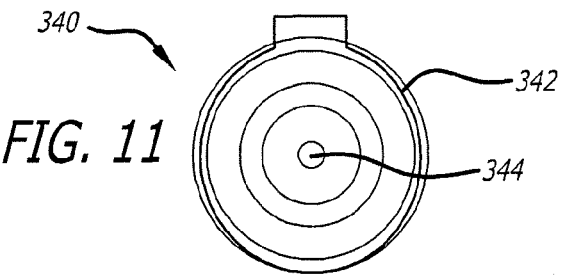
FIGS. 11 to 15 show preferred form representations based on aggregated data values.

FIG. 11 illustrates a contoured representation 340 generated by aggregating all site values over an area indicated by outline 342. The representation 340 could be generated from a single data point located at 344.

Figure 12:
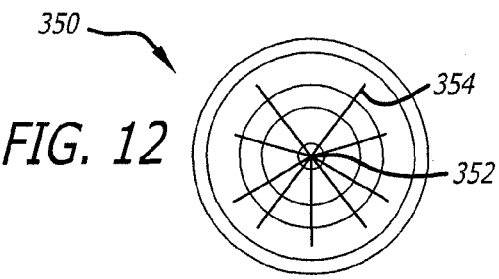

As shown at FIG. 12, in one preferred form of contoured representation 350, the representation could be generated from a single data point 352 representing the aggregate of individual sites located within the area shown in the representation 350. The representation 350 may identify the individual sites which are being aggregated by displaying lines 354 radiating from data point 352 to the position of each individual site.

Figure 13:
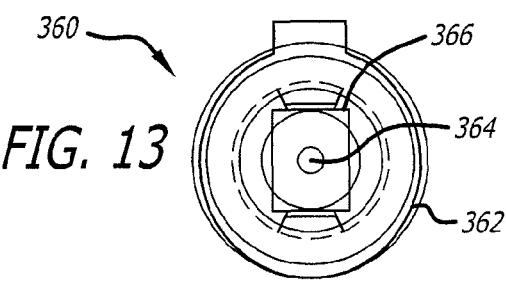

Referring to FIG. 13, the representation 360 could include outline 362 of the area over which the aggregation has taken place. The preferred representation 360 is generated as a function of a single central data point 364. The representation may also include a schematic view of a venue, for example a sports station or sports field as indicated at 366.

Figure 14:
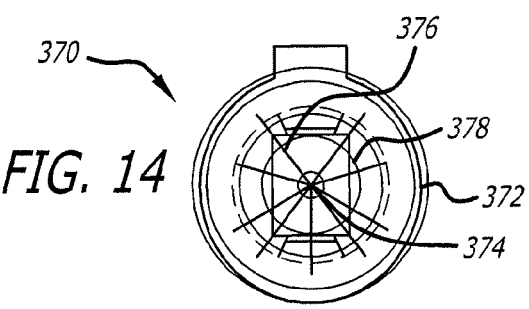

Referring to FIG. 14, a preferred form representation 370 could include an outline of a venue 372, a central data point 374, lines 376 radiating from a central point 374 to each site, and a schematic representation of the venue indicated at 378.

Figure 15:
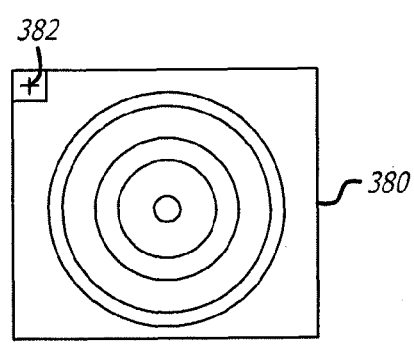
Figure 16:
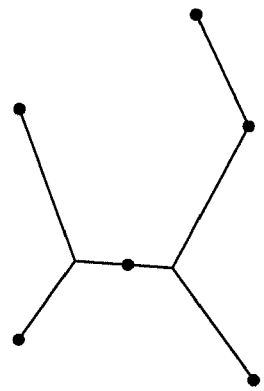
FIGS. 16 to 20 show preferred form representations based on distributed data values.
Figure 17:
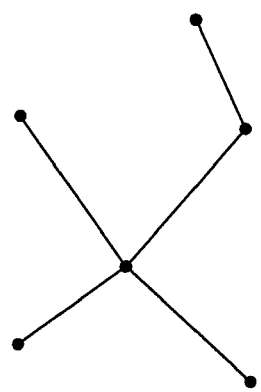

As shown in FIG. 15, the system may display representation 380 showing a simplified representation of the data. By clicking "zoom box" 382, the user could be presented with a more detailed view of the data, for example the views shown in FIGS. 11 to 14.

Figure 18:
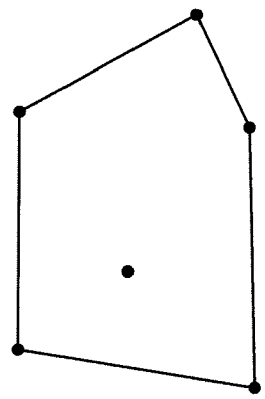
Figure 19:
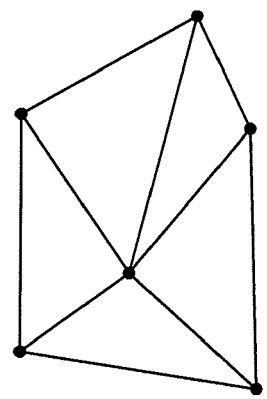
Figure 20:
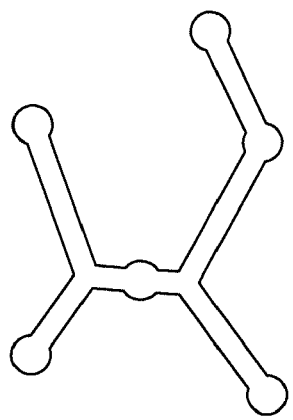

FIGS. 16 to 20 illustrate preferred forms of representations showing individual cell sites and connections between cell sites. Representations could include for example the skeleton shown in FIG. 16, a "no new point" skeleton shown in FIG. 17, a convex hull shown in FIG. 18, a combination convex hull and skeleton shown in FIG. 19, and "bones" shown in FIG. 20. It will be appreciated that different arrangements of sites are more suitable for certain types of site coverage. For example, the convex hull shown in FIG. 18 is particularly suitable for representing site coverage of a localised venue, for example a stadium, whereas the skeleton of FIG. 16 could be more suited to showing cellphone coverage over a more diverse geographic area.

Further forms of preferred representations are described with reference to FIGS. 21 to 24. It may be desirable to display the aggregation of several sites from a single data point but yet maintain the ability to display differences between site locations.

Figure 21:
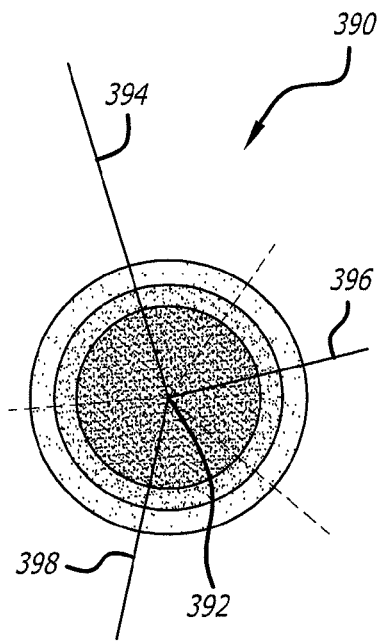
FIGS. 21 to 24 show preferred form representations showing directional information of data values relative to each other.

FIG. 21 illustrates one preferred form representation 390. The representation is generated from a single data point 392 which represents the aggregation of KPI values at three distinct cellphone sites. The positions of the sites are indicated by lines 394, 396 and 398, extending radially from data point 392 to each site.

Figure 22:
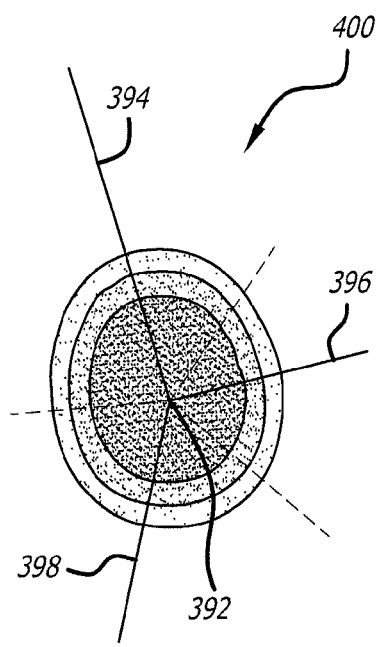

FIG. 22 shows a further preferred form representation 400 which is centred on single data point 392. The circular representation of FIG. 21 is essentially stretched in FIG. 22 along respective lines 394, 396 and 398, depending on the length of each line which in turn represents the position of each site.

Figure 23:
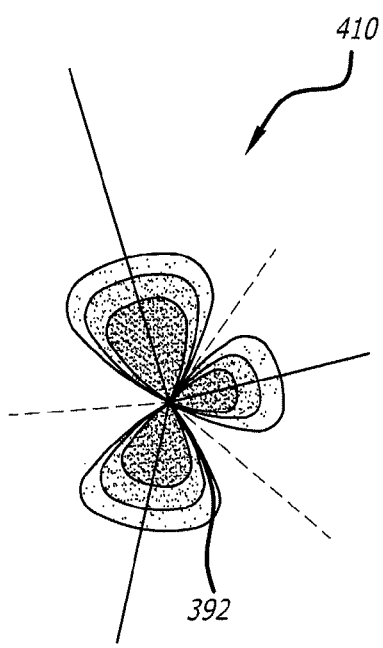

A further preferred form representation 410 is shown in FIG. 23, in which the contour lines representing the cellphone sites are each connected at central data point 392.

Figure 24:
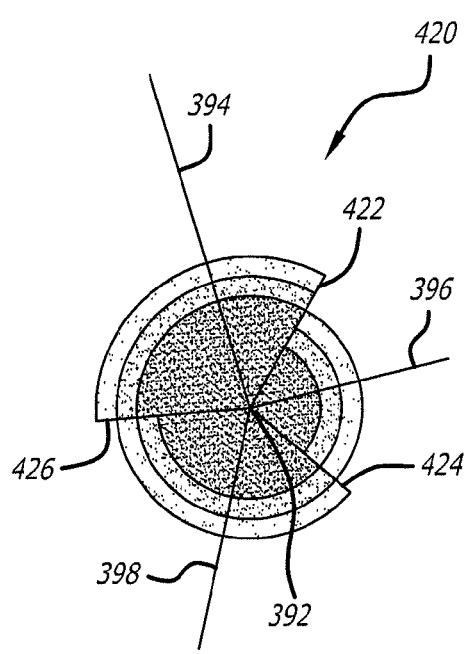

Alternatively as shown in FIG. 24, representation 420 could be divided into sectors. The representation is centred around central data point 392 with lines 394, 396 and 398 radiating outward from the data point. Sector lines 422, 424 and 426 are positioned between pairs of adjacent lines, and the representation is generated between these sector lines. Each sector preferably has a radius calculated as a function of the length of individual lines 394, 396 and 398.

It will be appreciated that the contoured representations of the invention could be applied to various types of electronic communications. For example, the system could display representations of communications over an analog or digital cellular network, a land line such as a PSTN, a paging network or a satellite network. As is becoming increasingly common, the system could also be arranged to display data relating to digital communications, for example text messaging and Internet communications.

The telecommunication service provider often needs to ensure that there are no gaps in the signal from site to site to enable continuous coverage and service. On the other hand, the provider must also resolve interference between sites, particularly in urban areas. The provider must also ensure that there are sufficient sites and cells in each geographic area to handle instances of high demand, for example sports events. Instances of high demand can lead to connection failure, such as "congestion" where a customer cannot make a connection and 'dropout' where, a customer loses a connection during a call.

The invention provides a user-friendly system and method for the telecommunication service provider to analyse the capacity and usage of a network. The system enables a telecommunication service provider to monitor periods and areas of high demand to enable the provider to reconfigure a network to cope with such demand.

Figure 25:
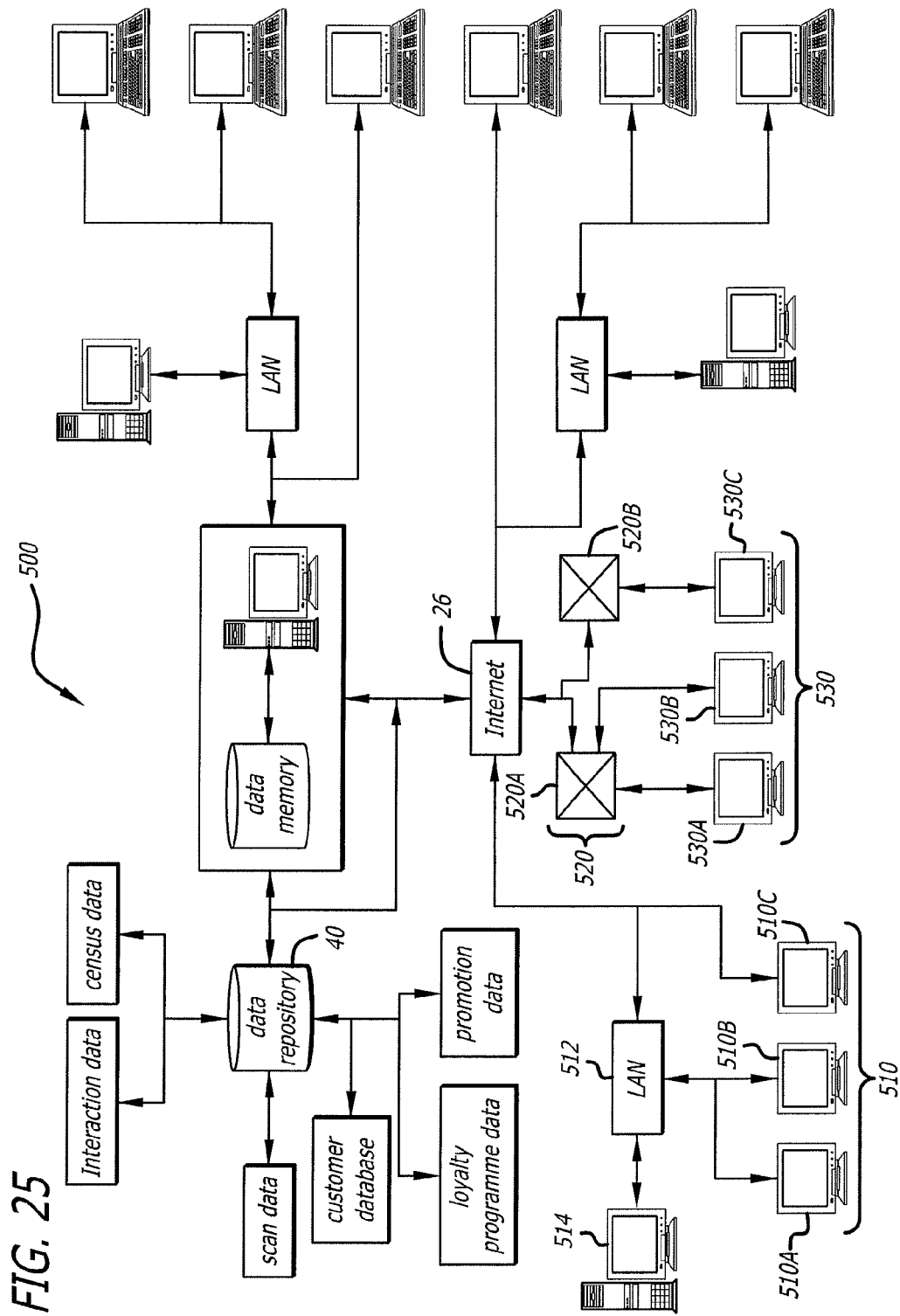
FIG. 25 shows a block diagram of a system in which another form of the invention may be implemented.

It is becoming increasingly common for merchants to operate websites as part of their business. FIG. 25 illustrates a block diagram of the preferred Internet-based system 500 in which the present invention may be implemented. The system is similar to that of FIG. 1 with the exception that the data repository 40 could be connected to the Internet 26. The system further comprises customer and merchant workstations. There could be one or more customers 510, for example customers 510A, 510B and 510C, which may each comprise a personal computer or workstation as described above. Each customer 510 is interfaced to the Internet 26. As shown in FIG. 25, each customer 510 could be connected directly to the Internet as shown with 510C with a suitable dial-up connection or could be connected through a local area network or LAN as is the case with customers 510A and 510B which are connected to local area network or LAN 512 connected to a network server 514 and communicate with the Internet 26 as shown.

The system also includes one or more web servers 520, for example web server 520A and 520B. Each web server 520 is connected to the Internet 26 as shown. Each web server 520 preferably comprises a personal computer or workstation operating under the control of suitable software. Connected to web servers 520 are one or more merchant computers or workstations 530, for example merchant 530A, 530B and 530C. Two or more merchants could be connected to the same web server as is the case with merchant 530A and 530B both connected to web server 520A. Alternatively, merchant 530C, for example, could be connected to dedicated web server 520B.

The, merchant 530 could include an individual, a company or organisation and will typically operate a website or other electronic medium through which customer 510 purchases goods or services. The merchant may alternatively operate an on-line casino, gambling or other gaming facility. The merchant could also offer transport and delivery, financial or banking services.

Customer 510 could include an individual, a company organisation. The customer could be a purchaser of goods or services from the merchant or could simply be visiting a web site operated by the merchant. An interaction between a customer 510 and a merchant 530 could be initiated by either the customer or by the merchant. As the customer 510 interacts with merchant 530, the interaction generates interaction data which is collected and stored in data repository 40.

Typical data records could include, for example, a merchant identifier. This merchant identifier could be used to identify a particular merchant and could comprise the universal resource locator (URL) of a web site operated by the merchant, or an Internet protocol (IP) address for the merchant.

The record could include a customer identifier. The customer identifier could include the IP address or other network address of the customer 510. The customer identifier could alternatively comprise a character string assigned to the customer by the merchant during a registration process with a facility for the customer to supply a user name and password to initiate an interaction in the known way.

The record could also include the universal resource locator (URL) of a web page visited by the customer 510 during an interaction. The record could include the date and/or time at which the interaction between the customer and the merchant took place, the cash value of any transaction if applicable, and a goods/services identifier where a transaction has taken place. It is envisaged that each new URL visited by a customer, for example each new page visited in a merchant website, generates a new interaction record. By retrieving and storing these records by date and time, it is possible to calculate the number of customers visiting a particular web site and the average time spent viewing a particular web page or page cluster, as will be more particularly described below.

Figure 26:
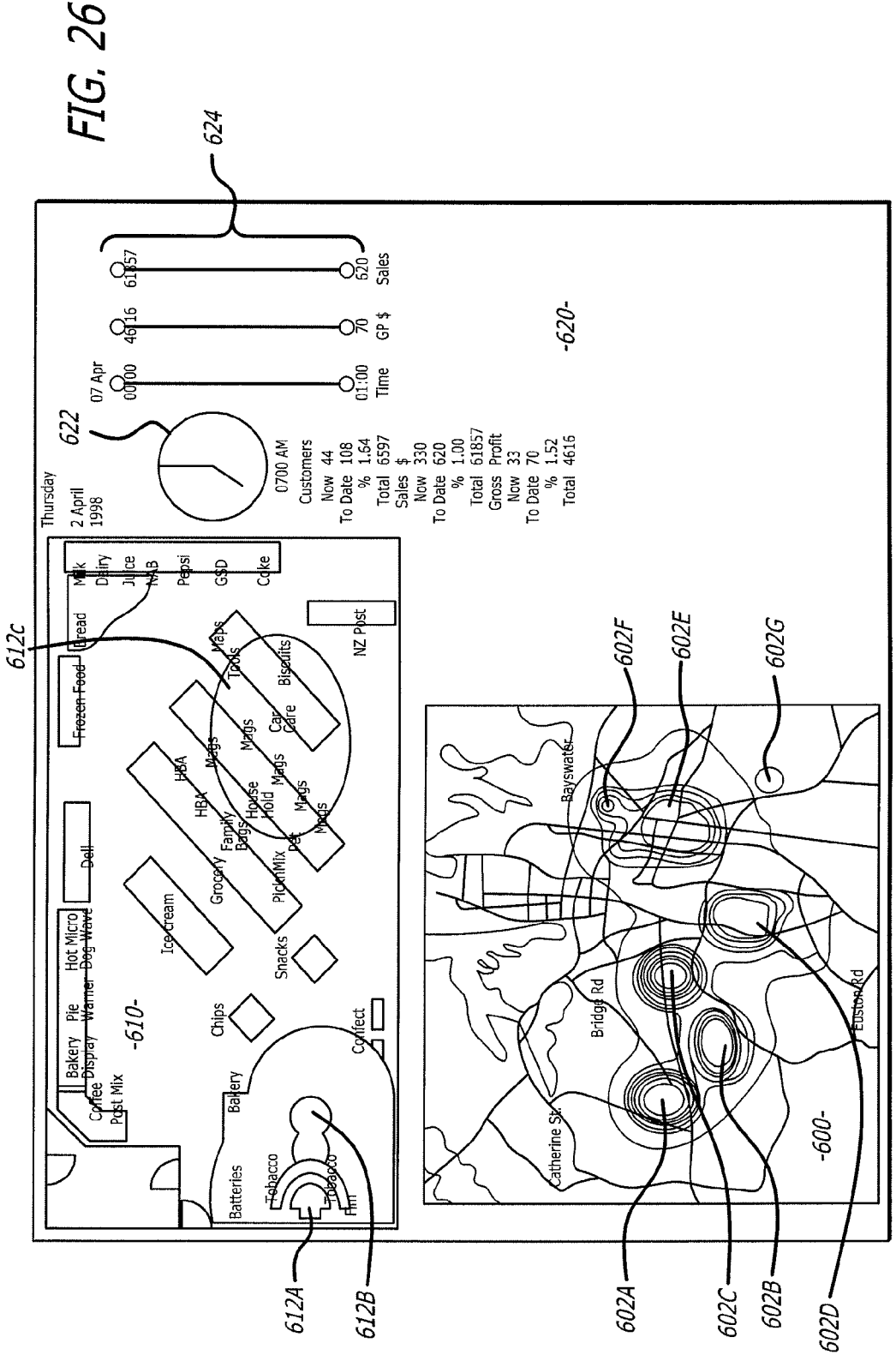
FIG. 26 shows a typical representation generated and displayed by the invention showing a customer provenance map and merchant store representation.

FIG. 26 shows a typical representation generated by the system. The display could include a customer provenance window 600. The preferred customer provenance window displays a graphical spatial representation in the form of a topological map. The map is arranged to show the origin of customers interacting with a particular merchant. It will be appreciated that the scale of the map could be altered, depending on the customer base under consideration. The map could include a detailed map, such as that shown in FIG. 26 showing suburbs in a particular city, could alternatively show individual cities in a particular country, or could be a global map showing all countries.

The interaction data from which the representation is obtained could include a customer origin identifier. Alternatively, customer origin data could be stored in one or more further databases and indexed by customer identifier.

It is envisaged that a customer provenance representation could be generated for any merchant customer application to which the system is applied. For example, the merchant could operate in a commercial premises or store, operate a wagering or betting service, a casino or other gaming facility, a car park, a telecommunications network or a website. The merchant could also offer a range of financial or insurance services. In each case the system could generate a customer provenance representation. The customer provenance representation could be generated as an alternative to or in addition to the representation of the merchant.

The system may present the data to the user based on one of a number of key performance indicators, or KPIs which could include total sales, gross profit, net profit, gross margin return on inventory investment (GMROII), net margin return on inventory investment (NMROII), return on net asset (RONA), loyalty sales data, time spent viewing a particular website and/or a web page visitation percentage. Each representation could show, for example, a combination of a number of customers, the number of sales and gross profit, as is the case in FIG. 26.

The preferred representation of data displays a particular value at a finite set of data points spaced over the representation, for example data points 602A, 602B, 602C, 602D, 602E, 602F and 602G. The value at each data point is preferably represented as a contoured representation, having a defined value centred on each data point with the values over the representation dropping away between data points. Data points with large values, for example 602E, are presented as higher peaks than data points with lower values, for example 602G.

The customer provenance map 600 as shown in FIG. 26 illustrates that the customers contributing to the largest KPI values have a provenance or point from which they interact with a particular merchant which is centred on point 602E. Customers contributing to the lowest KPI values for the merchant have a provenance at point 602G. It will be readily inferred from such a representation that the most valued customers are based around point 602E.

Each interaction record generated by a merchant customer interaction could include a customer identifier. This customer identifier could be linked to a physical address, within the requirements of any privacy restrictions, provided to a merchant by a customer at the time of registration or log-on. Alternatively, a geographic location could be inferred from the interaction itself. For example, a customer workstation used by a customer may use a particular network or Internet address from which a country code or indicator could be extracted. This would at least provide customer provenance data to country level.

Referring to FIG. 26, the system could also generate and display a representation of the merchant as indicated at 610. Where a merchant offers a range of goods or services, the representation 610 could comprise a graphical spatial representation of a "virtual store" similar to the store described above with reference to FIG. 7. The virtual store plan could show virtual positions of doors, service counters and shelves on which products are displayed. Where a merchant operates in a commercial premises or store in conjunction with a web site, it is envisaged that the representation 610 could comprise the actual graphical spatial representation of the store. Where a merchant operates from two or more retail stores, the graphical representation could include spatial representations of each store and could also include a large scale map of the geographic area in which the merchant's stores are located.

The representation 610 preferably shows distinct product types spaced, over the representation. As described above, each interaction record may include a goods/services identifier which could identify a product type. Each product type or grouping in the representation could represent a data point which is contoured in the same way as the customer provenance map 600 described above. Typical store plan data points are indicated at 612A, 612B and 612C. KPI values at individual points 612A, 612B and 612C are displayed as peaks, and values, of areas between these data points are shown as contours in the same way as that described above.

The display could also include a progress bar as indicated at 620. The progress par 620 could include a time display 622 and date information for a particular visualisation. The presentation could also display one or more KPIs, for example the number of customers, number of sales and gross profit for a particular visualisation and also display totals, cumulative totals and cumulative percentages.

It is envisaged that the representation shown in FIG. 26 could be presented to, a user as a still image or as an animated visualisation or AVI. The time display 622 would show the user the progress of the AVI. It is also envisaged that the main screen could include progress bars indicated at 624 which present a sliding scale of cumulative KPI totals to a user as the animation progresses.

Figure 27:
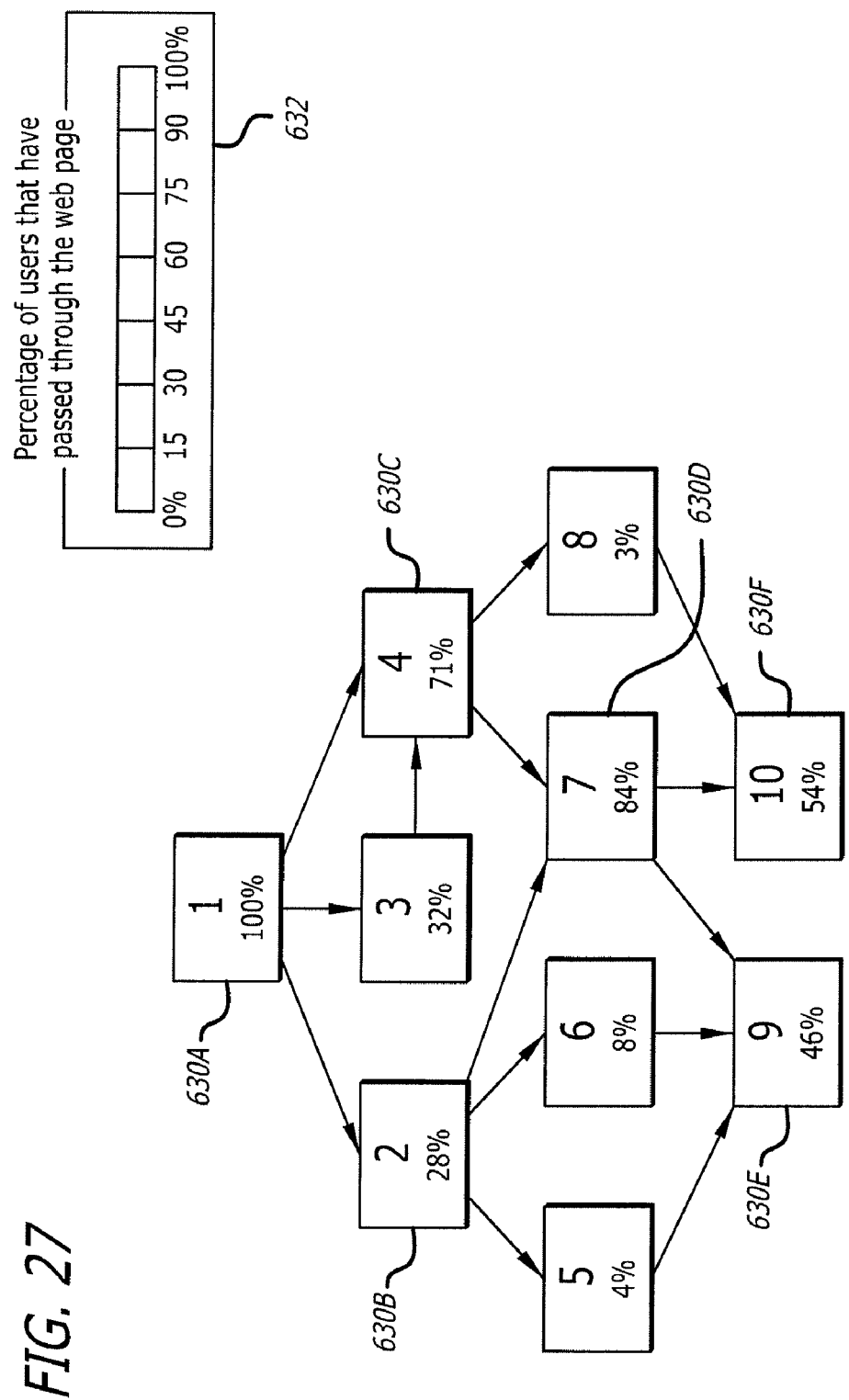
FIG. 27 shows a further preferred form representation generated and displayed by the invention showing the site map of a merchant web site.

The system is preferably also arranged to display a graphical site map of a merchant's web site. FIG. 27 illustrates one preferred form representation. Web site pages or page clusters are indicted, for example as boxes 630A, 630B, 630C, 630D, 630E and 630F. Each box is preferably shown with a page or page cluster number and a percentage representing the percentage of users visiting the web site who have viewed the particular page or page cluster. The user could also be presented with a legend 632 for shading relating to particular percentage values of visitation for each web page or page cluster.

For example, 100% of users visiting the web site have visited the home page shown as 630A. Web page 630B, which is accessible from web page 630A, has been visited by 28% of customers who visited page 630A. Web page 630C, which is accessible from web page 630A, has been visited by 71% of users. By retrieving a set of records from the data repository 40 using a customer identifier as a key, and then sorting these records by date and time, the usage of a web site by an individual customer can be tracked and displayed in accordance with the invention.

In a preferred form, the representation shown in FIG. 27 could have superimposed on it a representation of the data retrieved from the data repository in the form of a series of ripple contours, with those web pages attracting high usage being contoured as peaks. It will be appreciated that the KPI on which the representation is contoured could include any one or more of the KPIs discussed above, for example total sales, gross profit, net profit and the like.

Figure 28:
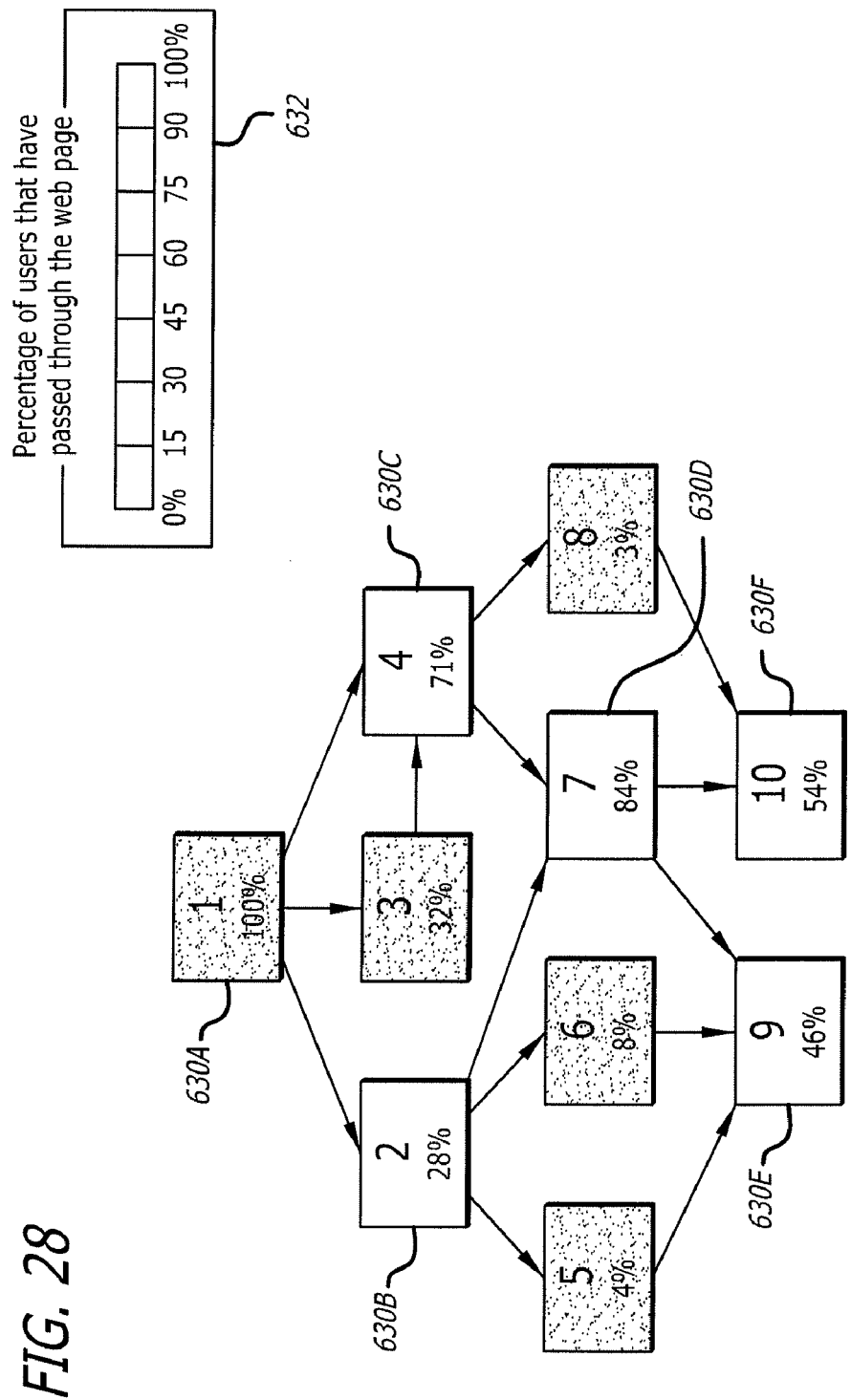
FIG. 28 shows the representation of FIG. 27 configured to identify traffic flow.

Referring to FIG. 28, the system may also be arranged to show traffic flow associated with a nominated page or page cluster. The user may be permitted to click for example on the representation of page 630D in the graphical representation shown to the user, causing this page to be highlighted. Contributing pages 630B and 630C are highlighted as are destination pages 630E and 630F. The remaining web pages are preferably greyed out. Customer traffic flow between web pages is preferably shown proportionally by the size of linking arrows. For example, the arrow linking web page 630B to 630D is thinner than the arrow linking web page 630C to 630D, indicating that web traffic from web page 630C to 630D is greater than web traffic from web page 630B to 630D. It is envisaged that the colour of the arrows could also be varied to represent traffic flow.

The system is also preferably arranged to calculate and display web site usage patterns. By retrieving a set of records from the data repository 40 using a customer identifier as a key, and sorting the records by date and time, the system can calculate how long a particular customer spends viewing a particular web page or URL by calculating the difference in time between successive interaction records involving different web pages or URLs.

Figure 29:
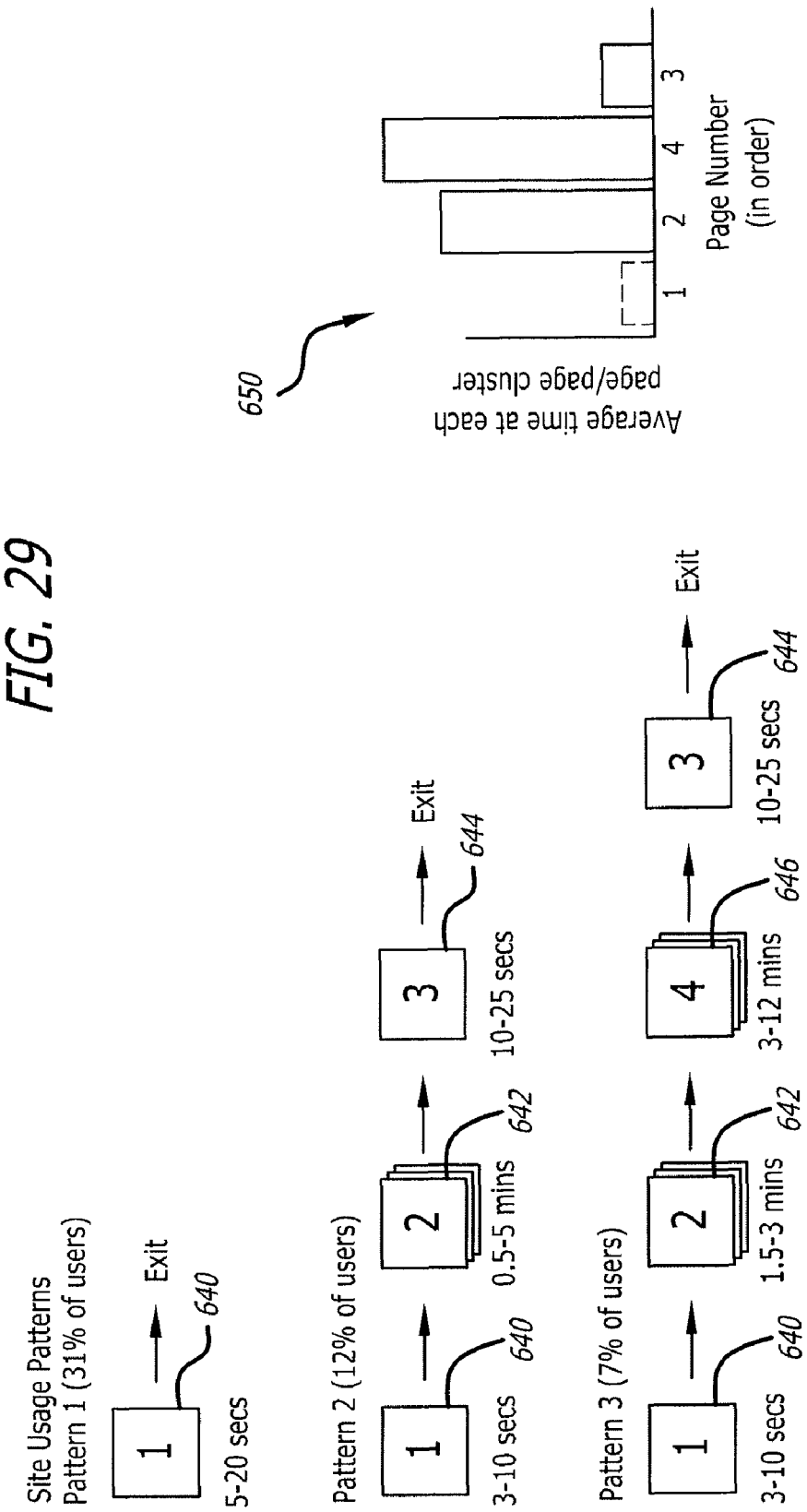
FIG. 29 shows a web site usage profile generated and displayed by the invention.

By compiling these usage patterns for individual customers, the system can develop and display a profile of site usage, for example as shown in FIG. 29 in which a merchant operates a web site having four web pages or page clusters. These could include for example a front page or menu 640, a second web page 642 which elicits from the customer a customised shopping list, a third web page 644 providing delivery and/or payment options, and a fourth web page 646 arranged to display specials to a customer and permit the customer to select one or more of these specials.

The system may recognise several patterns in site usage. For example, a first pattern could comprise 31% of all users who spend between 5 and 20 seconds viewing web page 640 and then exit. In a second pattern, 12% of all users could spend between 3 and 10 seconds on web page 640, between 0.5 and 5 minutes on web page 642, between 10 and 25 seconds on web page 644 and then exit. Pattern three could comprise 7% of users who spend 3 to 10 seconds on web page 640, 1.5 to 3 minutes on web page 642, spend 3 to 12 minutes on web page 646, spend 10 to 20 seconds on web page 644 and then exit.

The system could recognise these patterns of repeated web page and page cluster visitation and usage. It could rank these patterns based on the percentage of web site visitors that the pattern includes, and display details such as the pattern percentage, the average time spent at each page or page cluster as indicated at 650, and the resultant KPIs of different usage patterns. The system could display, for example, a finite number of most common usage patterns, the number being defined by the user.

The system could also be arranged to record and display further patterns of use of particular web pages. It is envisaged that the data repository 40 could be arranged to store further interaction data, for example the areas of a web page from which a particular customer makes selections or into which a customer types data, the areas to which a mouse pointer operated by customer is tracked and clicked while in the web site, and also the URL(s) of the source web page visited by a customer prior to visiting the web page under consideration, known as the click source, and/or the destination web page visited by the customer after visiting the web page under consideration.

The system may also be arranged to perform customer loyalty and marketing functions. The user could be provided with several options for generating mailing lists of web site users according to a particular criteria. For example, the system could generate a mailing list for those customers who have used the site, or those customers who fit a particular pattern of site usage as described above. The system could identify regular users of the site, calculate an approximate frequency of site usage, identify trends of increasing or decreasing usage across subsequent visits, and/or produce a list of those whose site usage changes for some reason. For example, the system could identify weekly shoppers who miss a week's order, customers who browse the 'weekly specials" page, customers who have started to visit a particular web page after being included in a promotional mailout, and whether the customer is making purchases as a result. The system could also be arranged to assemble mailing lists of those users who make heavy usage of help pages.

The invention assists a merchant to examine data relating to customers visiting a web site operated by the merchant. The user may make sense of and obtain useful data and from this data may identify optimal ordering of web page links on a merchant web site and select the most desirable ordering and positioning of these links. The user may also identify correlations between sales of different goods or services and may also identify the effectiveness of loyalty programmes and other incentive schemes.

Banking organisations are one example of merchants who collect enormous quantities of data concerning all aspects of their business operations. A banking organisation may want to monitor automatic teller machines or ATM usage and servicing in a city, what types of transactions are happening at different times of the day, or to look at bank branch usage patterns to justify the branch's existence. When a banking organisation wishes to launch a product or service into a new market, it would be helpful for the bank to be able to get a reliable model of their potential market penetration, and the probable makeup of that penetration model.

Figure 30:
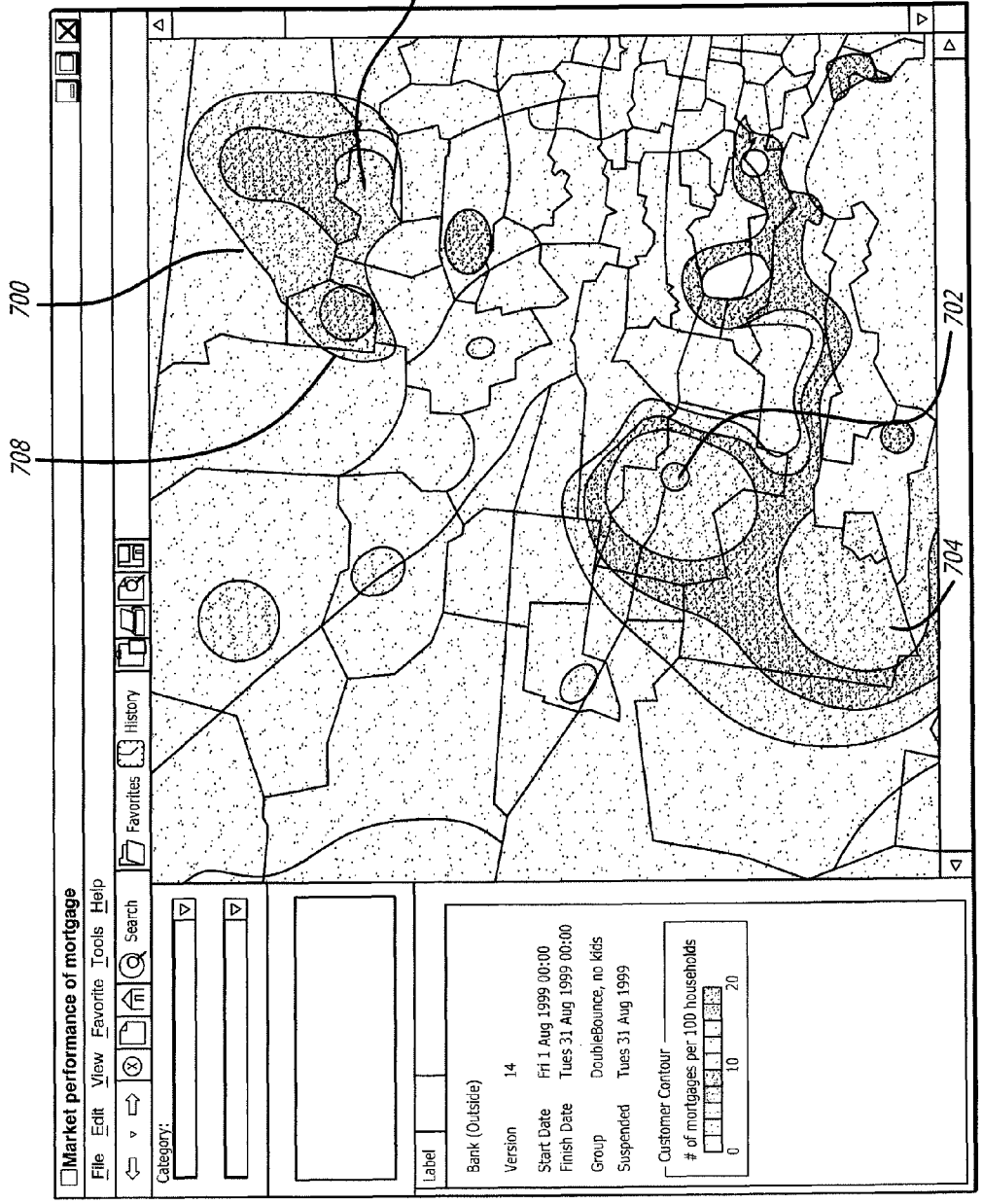
FIG. 30 shows a preferred form representation generated and displayed by the invention where the merchant provides financial services.

FIG. 30 illustrates one example of a display generated by the system for a merchant such as a banking organisation. One preferred representation includes a customer provenance window 700, which, shows, for example, the location of double-income couples with no children. Suburbs with high numbers of these mortgages are shown as indicated at data points 702 and 704.

The representation may indicate to a user that there is a marked difference in concentration of such mortgages in different suburbs, even though demographic data may show that these suburbs have similar demographic profiles. This would indicate to a user that a banking organisation has lower than expected penetration of a mortgage product in that particular suburb, thereby revealing a business opportunity. The representation shows that mortgage products have been sold more successfully to households in the suburb of East Uptown as indicated generally at 706 than in West Uptown as indicated generally at 708, despite the two suburbs having very similar demographic compositions. In this way, visualisation of a bank's customer base can be used in site analysis, whereby new sites are considered for opening branches or existing marginal sites require justification for continued operation, and for targeted marking campaigns.

Figure 31:
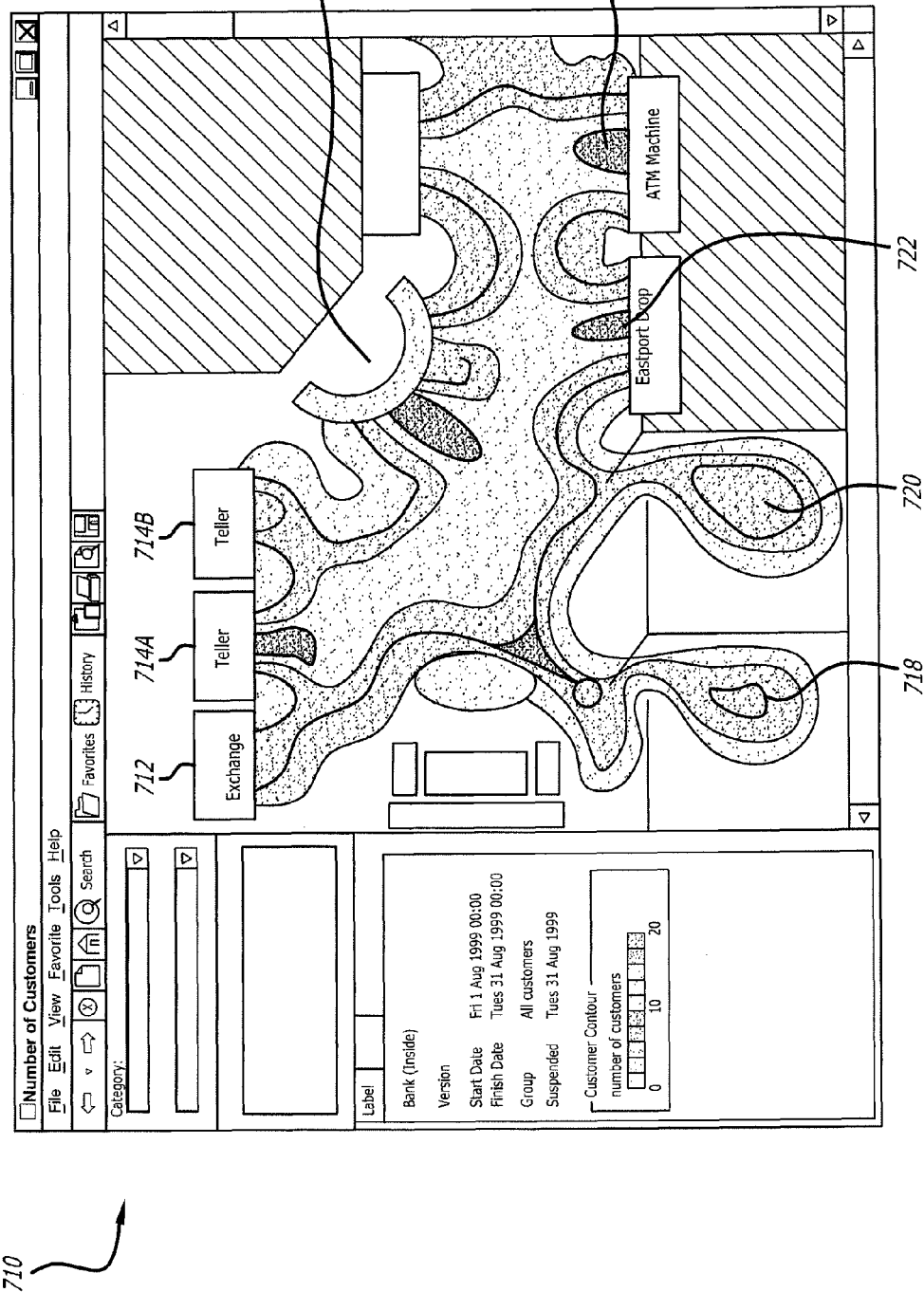
FIG. 31 is another preferred form representation where the merchant provides financial services.

FIG. 31 illustrates a further example of the display generated for a banking merchant. The representation 710 preferably comprises a floor plan of a bank branch including representations of different business units for example foreign exchange 712, tellers 714A and 714B, enquiries desk 716, manager's office 718, personal loans 720, fast-drop box 722 and ATM machine 724.

The representation 710 could be contoured on one of a number of KPIs. One KPI could be gross turnover which would indicate how each business unit is performing. Contouring on other types of transactions would show the different types of transactions which tend to occur at different times of the day. This would enable a banking merchant to measure the performance of different business units and branches and match specialist staff more closely to a bank customer's business needs.

It is envisaged that the invention will also have application for insurance companies. An insurance company may wish to review its business performance data, for example to assess a potential client's risk or to review premium levels. If the insurance company wishes to launch a product or service into a new market, it would be useful to be able to get a reliable model of the insurance company's potential market penetration, and the probable makeup of that penetration model.

The system could generate a visualisation showing a contoured representation depicting some KPI, for example the number or value of claims or the cost to the company. For example, the company could create a visualisation with various burglary statistics contoured on it, with concentrations of burglaries displayed as red "hot spots", and areas that suffer few or no burglaries being contoured in a neutral colour. The insurance company could use the summary information in the visualisation to help assess the risk of providing home and contents insurance. to customers living in those areas.

The system could visualise how different events have impacted on profits, insurance claims or uptake of products. For example, an event such as an advertising campaign that is promoted in a particular region, or a shift in police focus towards investigating more burglaries or arsons would impact upon the company profitability. The impact of these events could be summarised in a contoured visualisation.

The system could show uptake of the merchant's services and products, and visualise the results of in-depth marketing, queries and analyses. For example, the system could produce a visualisation of those customers who started policies and soon afterwards made insurance claims, or how changes to services for example police or fire service coverage, have impacted on uptake of products or claims on policies.

Figure 32:
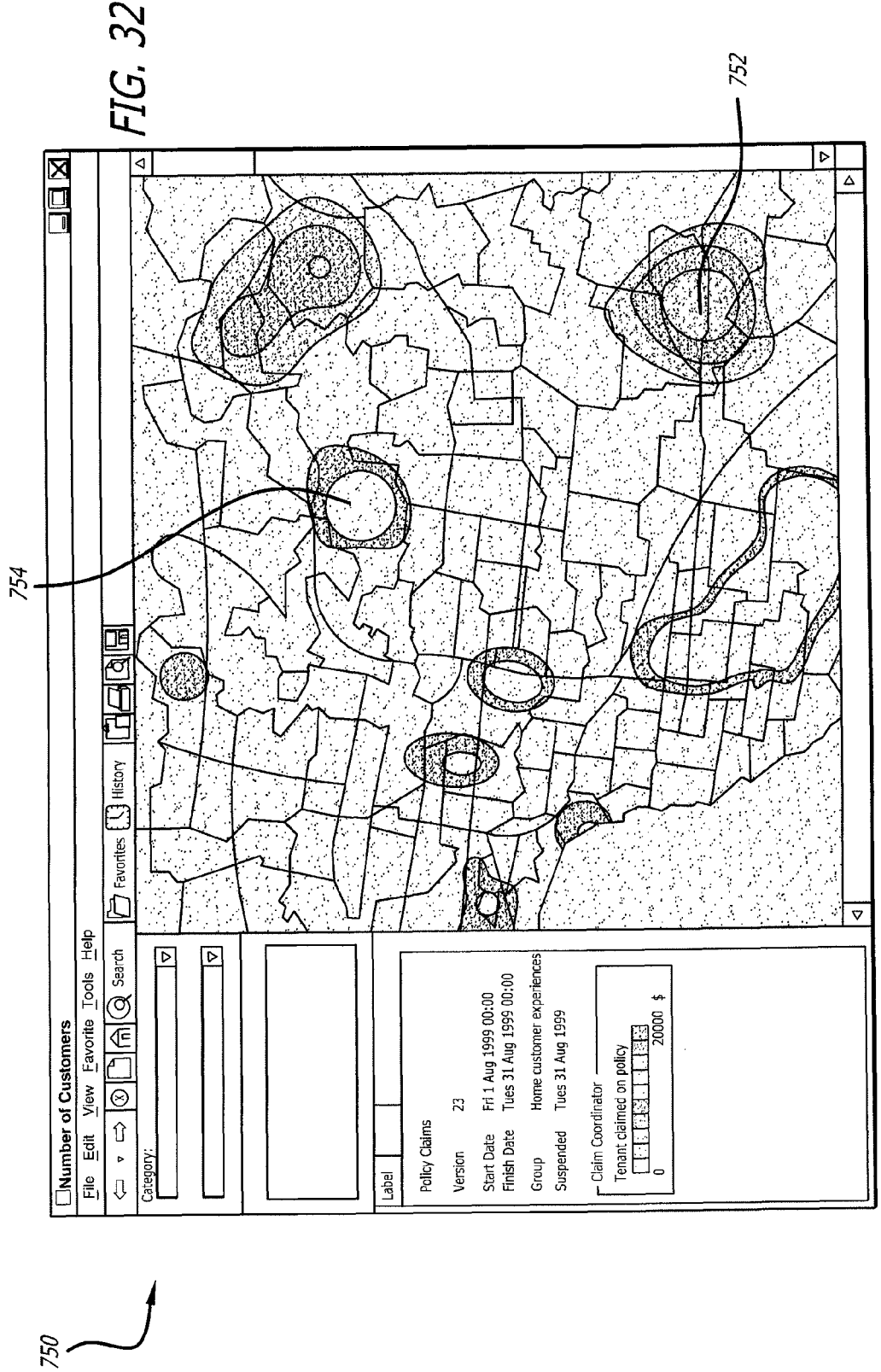
FIG. 32 shows a preferred form representation generated and displayed by the invention where the merchant provides insurance services.

Referring to FIG. 32, the system could show a customer provenance map 750 of customers who have made claims on their home and contents insurance during a certain period, with the size of the claim contoured as a data value. Data points indicated at 752 and 754 indicate high numbers and values of claims in certain areas.

It is also envisaged that the system perform and visualise predictive modelling of the potential penetration into a new market, based on the demographics of the merchant's existing customer base. This is achieved by evaluating the demographic makeup of the existing customer base, assessing the demographic makeup of .the new market, and extrapolating the data to produce the estimate. For example, if 15% of young men with a job who own a car worth between $5,000 and $8,000 currently insure their car with the merchant insurance company, then in the new market about 15% of young men with the same profile are likely to insure their car with the insurance company.

Another area of application of the system is in the analysis of manufacturing operations. Manufacturers require their facilities to be at capacity usage in order to maximise the return on investment in their business. For any process in manufacturing, a delay or bottleneck at some point in that process will hamper subsequent stages and lower the efficiency of the whole operation. It would be beneficial to enable a manufacturer to summarise and monitor the entire and/or particular aspects of a manufacturing operation; to ensure that the operation is working to capacity at all times.

Figure 33:
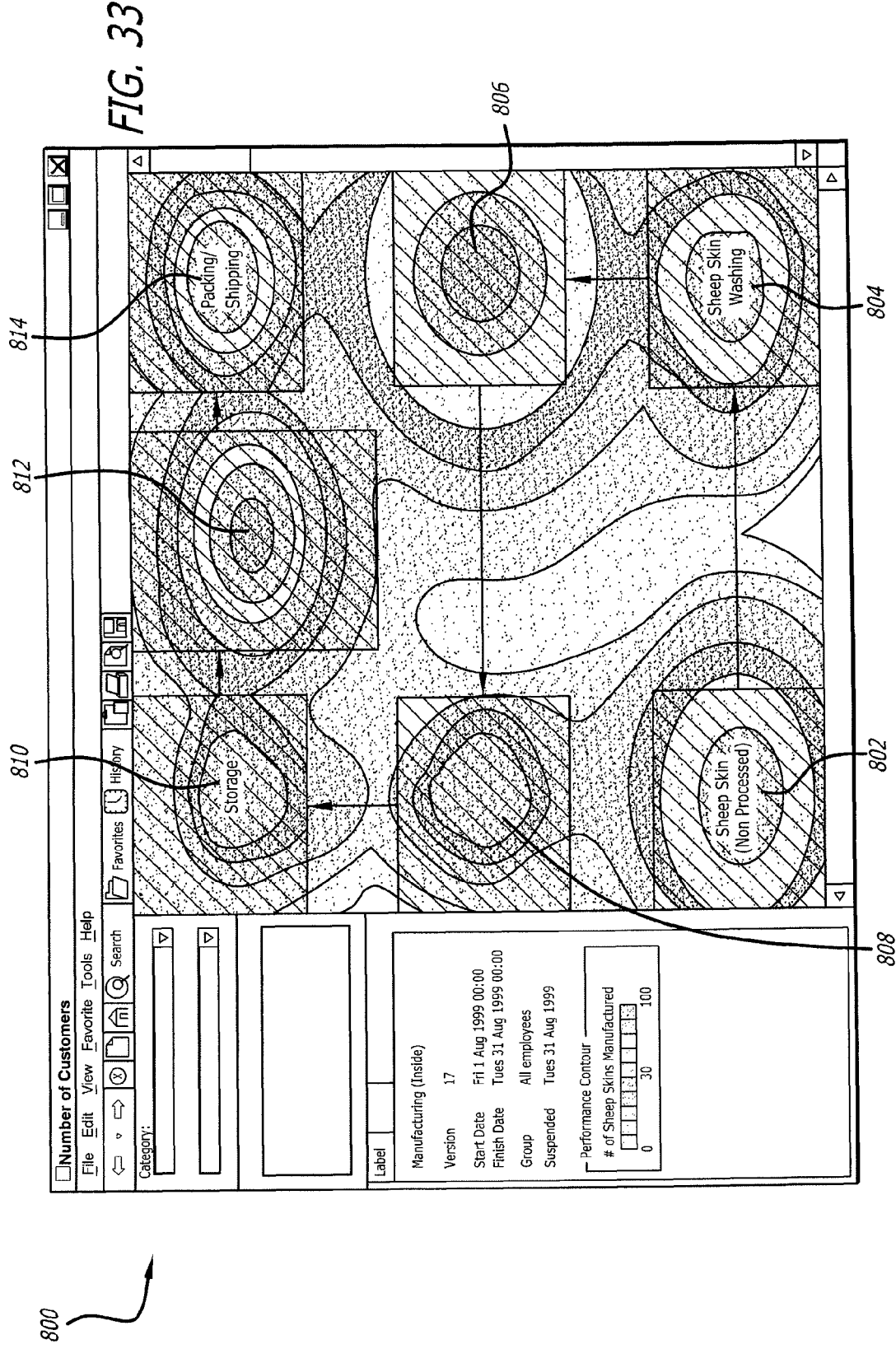
FIG. 33 shows a preferred form representation generated and displayed by the invention for a manufacturing process.

FIG. 33 illustrates one example of a visualisation based on the layout of a manufacturing or other workspace. The representation 800 illustrates the various stages involved in processing a sheepskin. Non-processed sheepskins indicated at 802 are washed at step 804. The washed sheepskins are then buffed at 806 and tanned at 808. The tanned skins are then stored at 810, dried in a drying room at 812 and then packed and shipped indicated at 814.

In representation 800, the number of sheepskins processed at each particular stage of the manufacturing operation comprises a data value and is contoured. It is readily apparent that the tanning room 808 in FIG. 33 is processing fewer sheepskins than the buffing room 806 can produce for it. Such a visualisation could draw to the attention of the manufacturer the operations of the tanning room so that appropriate action can be taken, for example staff or resource reallocation.

The system can produce an efficiency analysis of different areas of the production process, and can assess proposed changes to the manufacturing operation. This application could also assist with staff rotation after measuring their performance.

In a further preferred form of the invention, the data repository is arranged to store a sports database of data representing one or more sports events. It is becoming increasingly common to collect large volumes of data each time a game of sport is played. For example, a game of rugby union generates statistics such as the total number of points scored, the number of tries scored and the number of tries scored which are then converted. Other statistics include ball possession representing the proportion of the game during which a particular team had possession of the ball.

There is an increasing trend towards analysis of collected data with a view to analysing opponent's strategies and as a coaching aid in assessing the strengths and weaknesses of a particular team. It is also especially desirable with televised sports to present the collected data to spectators in a form which is easily interpreted.

FIG. 34 illustrates a preferred form database schema 900 suitable for maintaining sports data in the data repository 40. The schema 900 is shown as a single table in a relational database. It will be appreciated that this table could be normalised to an appropriate extent. It will also be appreciated that schema 900 could alternatively be represented in an object-oriented form.

The schema 900 shown in FIG. 34 is particularly suitable for storing data representing possession and territory in a rugby game. A typical record represents a time slice and may include, for example, a record identifier 902. The schema 900 may also include game identifier 904 to uniquely identify the particular sports event represented. The schema 900 may also include a possession field 906 which indicates which team is in possession of the ball in a particular time slice, a time and/or date indicator 908 and a half field 910 representing the half of the game represented by a time slice.

The schema may also include geographic co-ordinates. The geographic co-ordinates Shown in FIG. 34 include X co-ordinates 912 and Y co-ordinates 914 representing the geographic position of the rugby ball on the field in a particular time slice in the New Zealand Map Grid (NZMG) Local Co-Ordinate System Notation. It is envisaged that the geographic co-ordinates could alternatively be represented in Australian Map Grid (AMG) notation or as a latitude or longitude.

Figure 35:
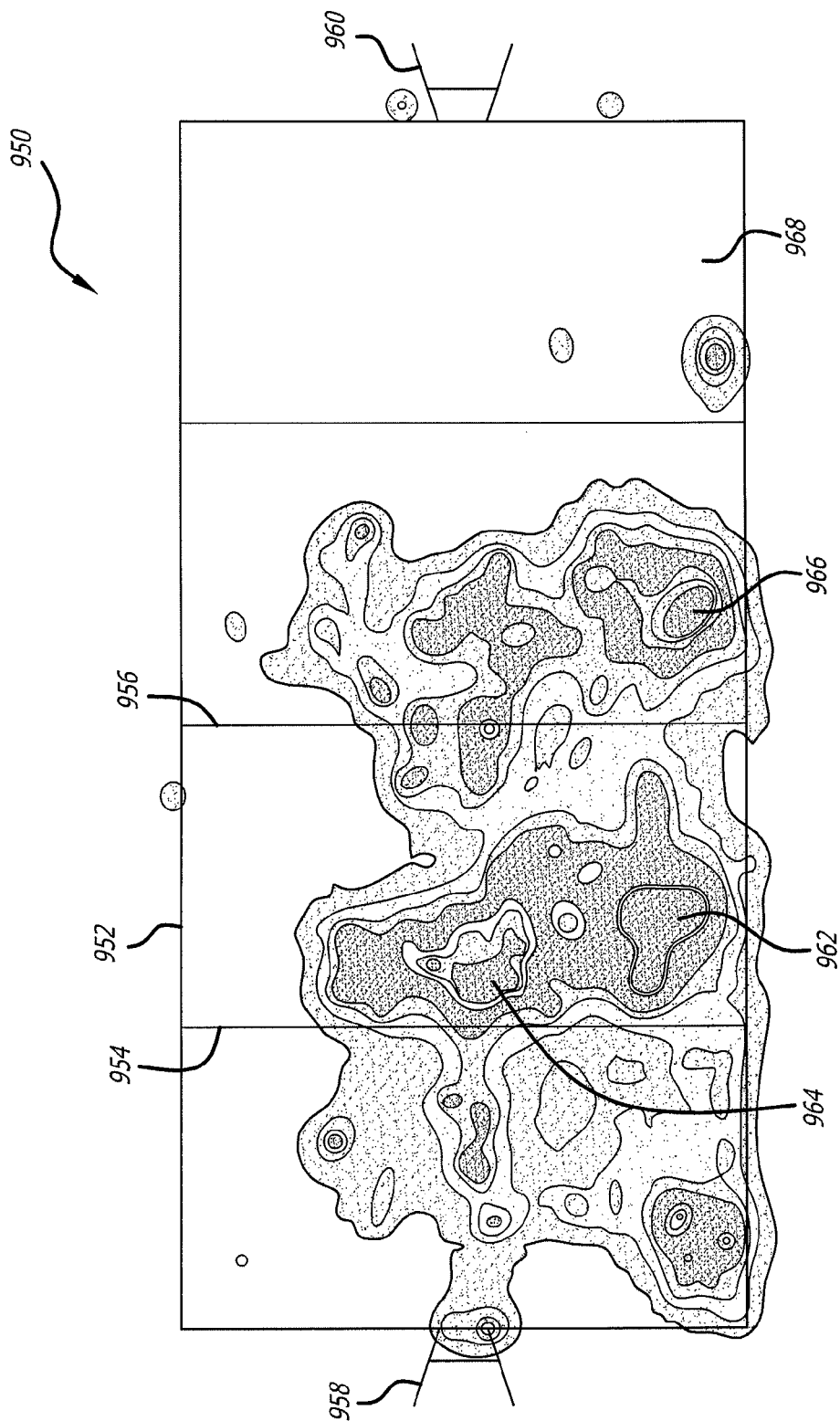
FIG. 35 shows a preferred form representation generated and displayed by the invention involving sports data.

FIG. 35 illustrates a representation 950 showing a plan view of a rugby field showing boundary lines 952, territory lines such as the 22 indicated at 954 and the halfway line indicated at 956. The representation 950 may also include goal posts 958 and 960. The representation 950 is an example of the sports venue or playing field on which the rugby game is played.

As shown in FIG. 35, the system is arranged to display a contoured representation of the data retrieved from the data repository 40. It is envisaged that the contoured representation could be superimposed onto graphical representation 950 as shown in FIG. 35. Alternatively, the contoured representation could be displayed adjacent to the representation 950, or as an alternative to the representation 950.

The preferred representation 950 is divided into a plurality or grid of areas. The number and spacing of these areas will in each case depend on the result desired. Smaller grid areas will result in a more detailed representation whereas larger grids will result in a less detailed representation. In one preferred form, the total time that the ball is located in a particular area during a rugby game is calculated from data retrieved from the data repository 40. In the contoured representation of FIG. 35, the location of the ball throughout the game can be represented with X and Y values being the geographic co-ordinates of the rugby ball and the Z value being the total time, or a percentage or portion of the total time, that the rugby ball is located at point (X,Y).

As shown in FIG. 35, the points shown at 962, 964 and 966 respectively indicate geographic locations in which the ball is located repeatedly during the game and areas such as 968 indicate areas in which the ball was not located at all, or not located to a noticeable extent, during a game.

It is envisaged that the contoured representations could be shown as single summary frames or stills or could alternatively be represented as a series of frames in an animated sequence or AVI. It will also be appreciated that the user may be provided with a query facility to select desired frames to display. Where an animated sequence is presented to the user, the user could be provided with the ability to select an appropriate time period to view and also be provided with the facility to control the rate or speed at which a sequence is displayed to the user.

It is envisaged that the nature and scope of data representing a sports event and the contoured representation of the data could be varied. For example, a contoured representation could be produced of ball possession during a rugby game. The ball possession of a particular team could be obtained by summing each time sequence in the data repository from the time a team acquires possession of the ball to the time the team loses possession. It will be appreciated that the database schema 900 could include one or more fields representing the nature of play in a particular time, for example a scrum, maul, charge, line-out, mark, penalty or conversion. Furthermore, the magnitude and direction of change in the geographic position of the ball could be used to calculate the effectiveness of a scrum, maul or charge.

The system could additionally or alternatively be arranged to store in data repository 40 other statistics and key performance indicators. For example, team KPIs could include the score, amount of possession, territory, the number of penalties conceded, scrums or mauls that are won or lost, and line-outs that are won or lost. Individual player KPIs could include points scored, tackles made both successful and unsuccessful, handling errors, breaks or half breaks, yards gained in a charge, kicks/passes and runs, turnovers, passes and tackles, penalties, dropped ball as a percentage per game for a pass or from a kick and charge downs.

The system could also store and present KPI groups such as a general overview, a first ⅝ view, forward view, loose view, back view and/or outside back view.

The system may also store other KPIs such as the number of kicks in a game, weather factors such as wind speed and direction, rain, sleet or snow, representations of the particular grass or soil, the captain and coach of a particular team in a particular game, and the nature of game, whether it is a local or international challenge or whether it is a semi-final or final.

Figure 38:
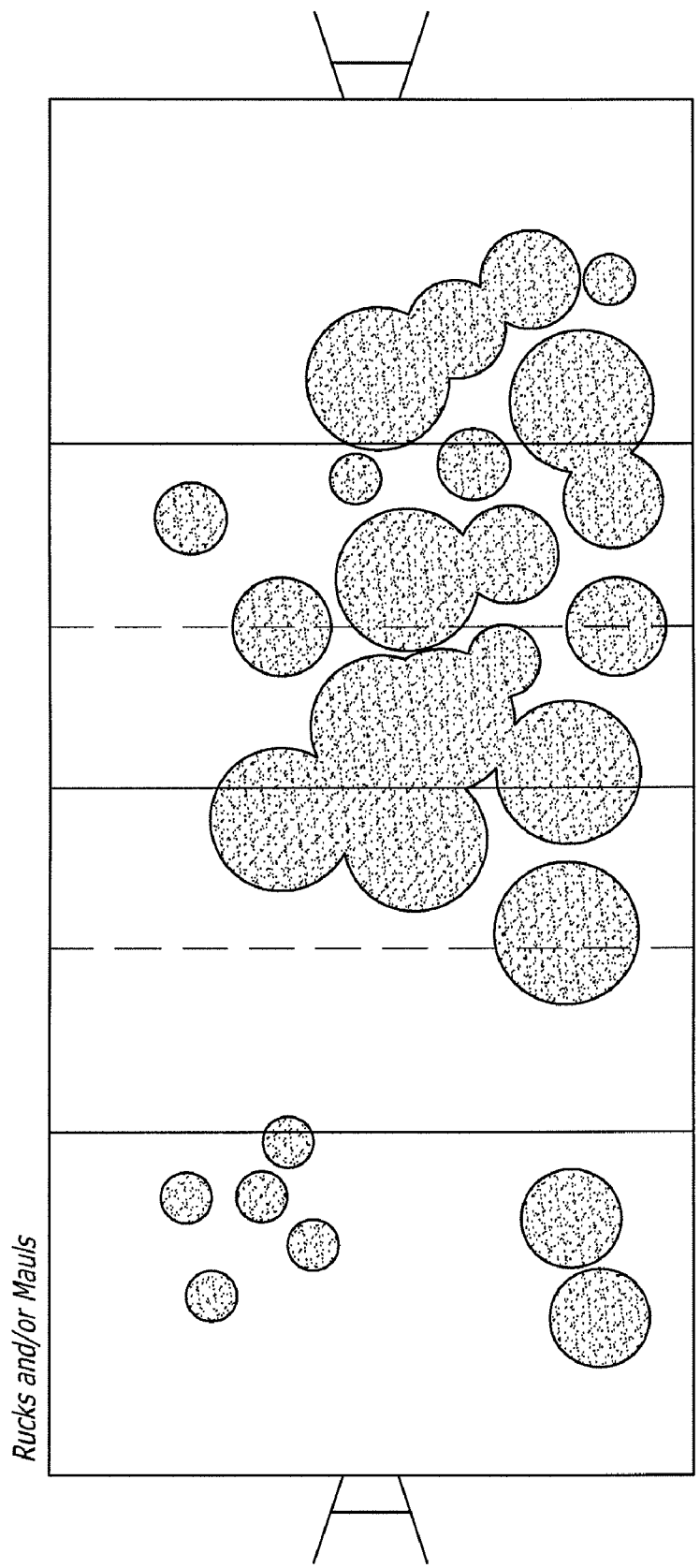

FIGS. 36 to 38 illustrate further representations which could be presented to a user in relation to a sports event.

FIG. 36 illustrates ball possession of each team in a rugby game and the position on the field in which possession is secured.

FIG. 37 illustrates one preferred form of displaying breaks in a game. The width of the arrows indicates the number of breaks and the location on the field in which the arrow is placed. Where the display is animated, the arrows could fade with time to illustrate ball play. Various other features of a rugby game can be represented in a visual manner by the use of graphical images. The size of each image indicates the number of instances of a particular game feature which have occurred in that location.

FIG. 38 Illustrates rucks and/or mauls represented by a series of dots. It is envisaged that dots and other symbols could be used to represent other gaming features, for example line-outs, penalties awarded, errors, turnovers and combinations such as missed penalties and kicks for touch.

Figure 39:
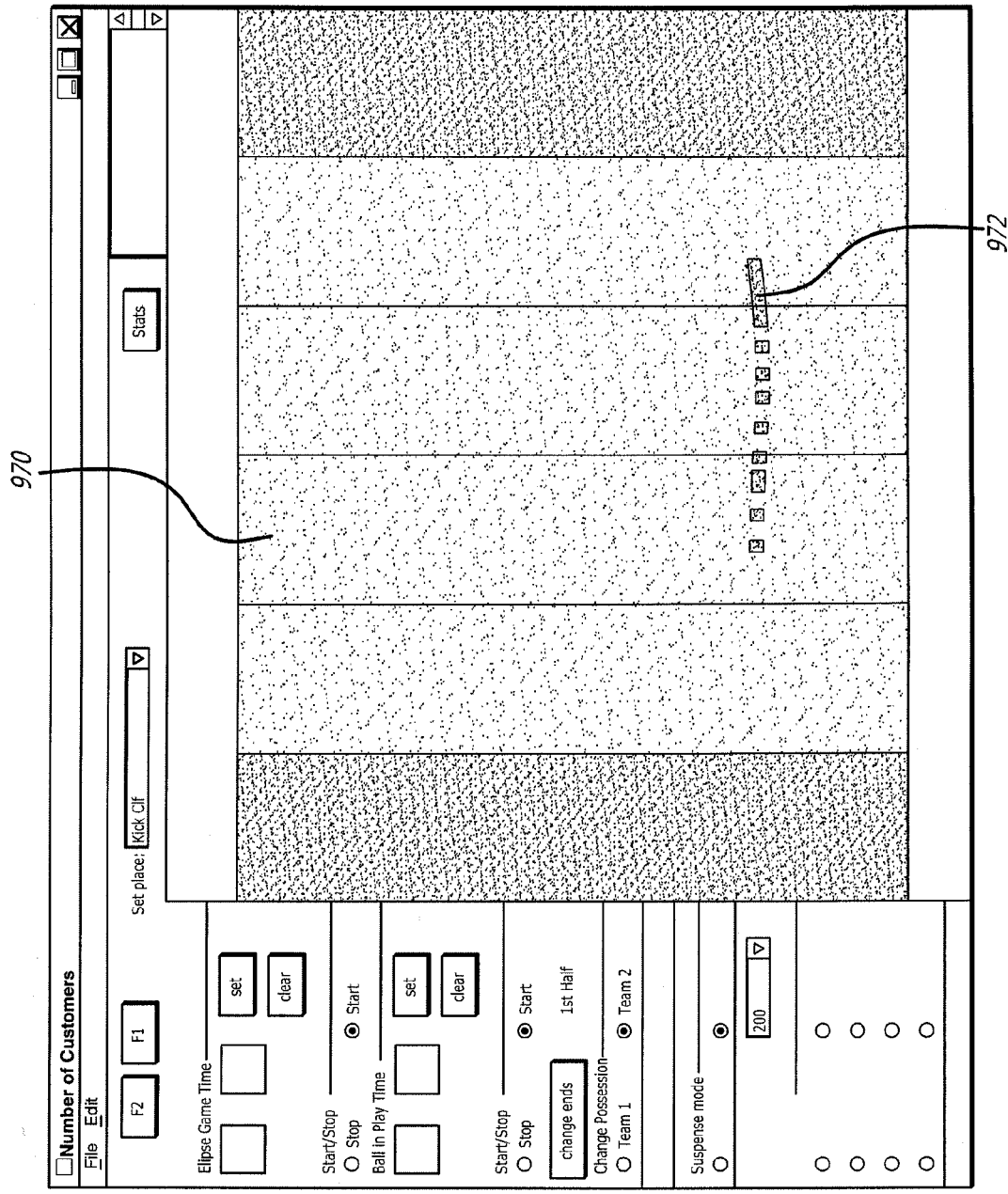
FIG. 39 is one preferred method of sports data acquisition.

FIG. 39 illustrates a preferred method of data acquisition arranged to capture data for storage in and subsequent retrieval from the data repository 40. Actual footage of a recorded rugby game could be displayed in a game window (not shown) on a display device. A graphical representation of a venue is displayed in window 970. The representation shown in 970 is divided into a grid, each element in the grid representing a geographic location at the sports venue.

A user views video footage in the game window and notes the position of the ball at a particular time. As the ball is moved around the playing area, the user operates a pointing device such as a mouse, trackball, joystick or other suitable device to alter the position of cursor 972 in window 970. The position of cursor 972 is automatically recorded and the corresponding geographic position of the ball on the playing field is calculated from the position of the cursor 972 in window 970. In this way, the position of a ball through a game can be calculated.

It is envisaged that this data acquisition could be at least partially automated. For example, the location of the rugby ball in a plurality of time slices could be calculated using known image processing techniques. Successive images of the rugby field could be analysed and the ball identified in the images from the shape and/or colour of the ball.

The data acquisition steps could be further supplemented by manual techniques such as individuals viewing the game and keeping statistics, or by automated techniques such as by tracking movement with a suitable GPS system.

The data repository 40 could be arranged to store demographic player profiles, including for example age, weight, tackles made, tries scored, total number of runs, number of times over the advantage line, whether or not runs lead to turnover, instances of dropped ball, instances of isolation, successful pass/handoffs, type of run preferred (kick and chase vs break), total yardage gained in the run, and field position. The database could also store data on injuries, development, teams, referees and/or coaches.

It will be appreciated that the contoured representations described above could be applied to a plurality of sports. With appropriate modification of the database schema, graphical representation of the sports venue, and the contoured representation, the system could be applied to sports such as rugby league, soccer, tennis, golf, grid iron, baseball, softball, Aussie Rules, hockey, ice hockey and basketball. The system could also be applied to track and field athletics events and also horse and dog racing.

The invention provides a user-friendly system suitable in the field of sports analysis, for analysis of opposing teams, for use as a coaching aid, and for live viewing for spectators. Preferred forms of the invention may perform player profiling, track game development, pinpoint the circumstances leading to a player's injury, and assist coaches and sports management with assessing referee performance.

In a further preferred form, the merchant's business could involve reservation of products or services for use by the customer, such as carparking, boat moorings, secondary and tertiary course allocation, seminar event or course bookings and plane, boat and train bookings. Owners of carparking buildings, for example, require maximum utilisation of available space in order to maximise profits. Such merchants inevitably run below maximum capacity, even in environments where there is a heavy demand for their service, as some places that are booked and/or paid for are often not used. For example, the prepaid carparks in a carparking building will probably not all be used on any given day, due to work sickness, out of town trips, annual leave and the like.

The data repository 40 could be arranged to store data relating to for example carparking buildings. This data could include percentage of occupation, the length of stay, the time of arrival and departure, and preferred position. The system could be arranged to display the merchant premises and superimpose the data values in the form of contoured representations.

Figure 40:
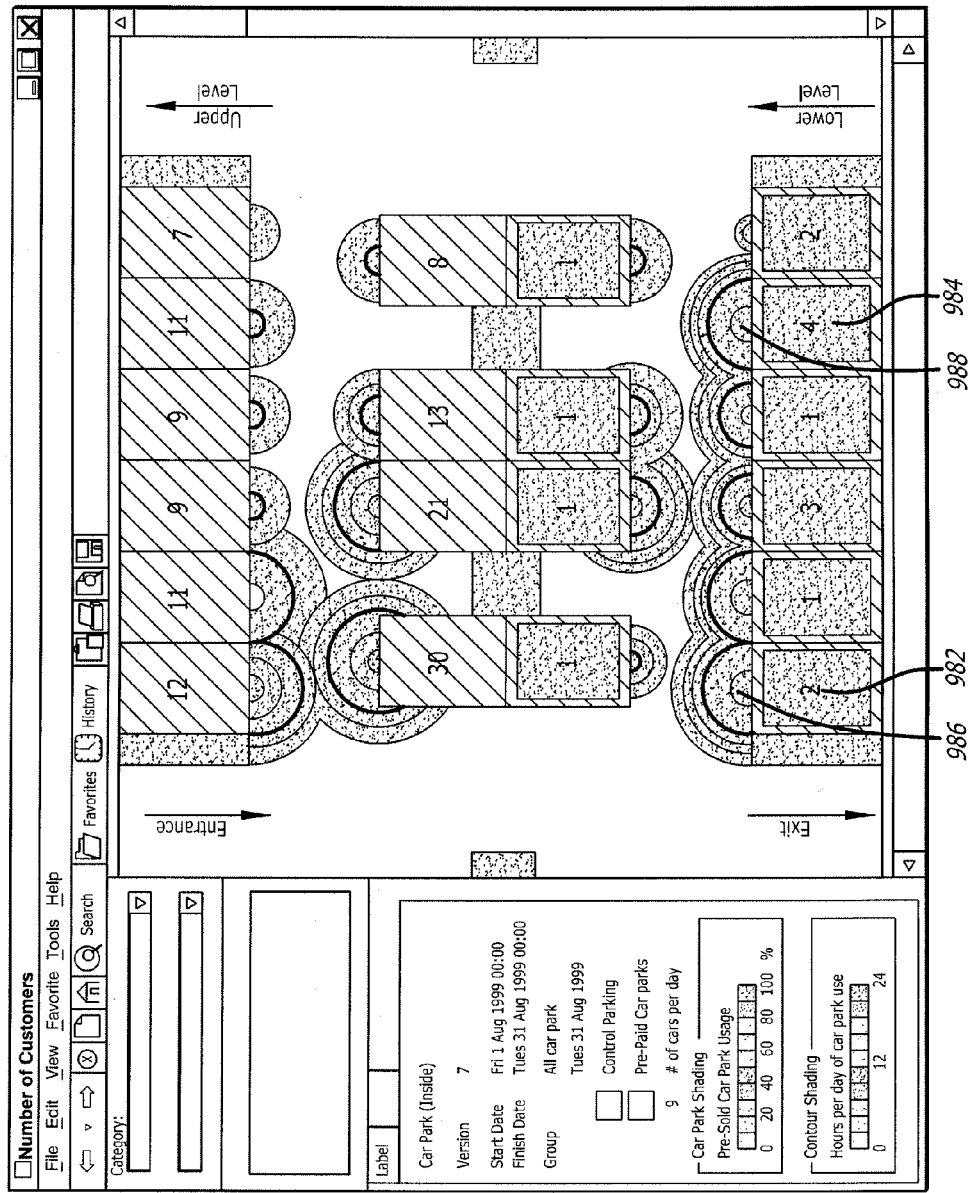
FIG. 40 is a further preferred form representation generated and displayed by the invention involving carpark operations.

FIG. 40 illustrates one example of a display 980 generated by the system where the merchant is a carpark operator. The display 980 preferably comprises a floor plan of the car park building. Individual car parks are shown, for example, at 982 and 984, with corresponding contoured representations indicated at 986 and 988.

Where such visualisation identifies a time period for a facility with consistently low occupation, the merchant can target the market to boost occupation or to lure competitor's customers. For example, a carparking business that identifies an evening with consistently low building occupation may offer a cheap parking movie ticket deal with a nearby cinema complex.

The system enables a merchant to optimise returns by revealing the weekday and time of year and the like when facilities can be oversold, and the margin by which they may be oversold. For example, if a parking building has 120 parks, the system may reveal they are able to sell 135 prepaid parks during the winter, and 128 prepaid parks during the summer, and then after a particular time of day, for example 9:30 am, they can sell any remaining empty prepaid parks to casual parkers. The data visualisation may also reveal that on winter Mondays the merchant has far more empty prepaid parks than any other day of the week, which the merchant could then market to casual parkers.

It will be appreciated that the uses and potential areas of application of the system are wide and varied. Merchants and other organisations do not need to follow the traditional approach of forming a hypothesis in advance and then verifying the hypothesis, although the representations generated by the system may be useful for verifying a particular hypothesis. The system presents data in an easily interpreted and intuitive manner may be useful in identifying unexpected trends in the data. The foregoing describes the invention including preferred forms thereof. Alterations and modifications as will be obvious to those skilled in the art are intended to be incorporated within the scope hereof as defined by the accompanying claims.

What is claimed:

1. A method of data visualisation comprising:
    maintaining in a data value memory a finite set of data values;
    displaying a representation of each data value centered on respective data points; and
    generating and displaying a representation having a cross-sectional shape of a bell-shaped curve using a processor such that each data point is displayed as an apex of the bell-shaped curve.

2. A method of data visualisation of claim 1, further comprising:
    maintaining in a memory an interaction database of interaction data representing interactions between customers and merchants;
    retrieving from the interaction database data representing interactions between customers and merchants;
    constructing the finite set of data values from the retrieved data; and
    storing the data values in the data value memory.

3. A method of data visualisation of claim 2, wherein the merchant operates from one or more commercial premises, the method further comprising displaying a graphical spatial representation of the premises of the merchant.

4. A method of data visualisation of claim 3, wherein the merchant sells a range of products to customers, each product having a product code, the method further comprising maintaining a product code for each interaction in the interaction data.

5. A method of data visualisation of claim 3, wherein the merchant operates a casino or gaming venue comprising one or more stations, each station having a station identifier, the method further comprising maintaining a station identifier for each interaction in the interaction data.

6. A method of data visualisation of claim 3, wherein the merchant comprises a wagering or betting service provider, the method further comprising maintaining a wager or betting service provider, the method further comprising maintaining a merchant identifier and a monetary value for each interaction in the interaction data.

7. A method of data visualisation of claim 3, wherein the merchant comprises a financial or insurance services provider comprising one or more business units, each business unit having a business unit identifier, the method further comprising maintaining a business unit identifier for each interaction in the interaction data.

8. A method of data visualisation of claim 3, wherein the merchant provides reservation of products or services, the method further comprising maintaining a merchant identifier and the time of the interaction for each interaction in the interaction data.

9. A method of data visualisation of claim 1, further comprising:
    maintaining in a memory a manufacturing process database of data representing one or more manufacturing processes;
    retrieving from the manufacturing process database data representing a manufacturing process;
    constructing the finite set of data values from the retrieved data; and
    storing the data values in the data value memory.

10. A method of data visualisation of claim 9, wherein the manufacturing process comprises one or more manufacturing stages, each stage having a stage identifier, the method further comprising maintaining a stage identifier for each interaction in the interaction data.

11. A method of data visualisation of claim 2, wherein the merchant comprises a telecommunications service provider operating a telecommunications network, the display further arranged to display a graphical spatial representation of a network or part of a network operated by a merchant.

12. A method of data visualisation of claim 2, wherein the merchant operates from one or more web sites which are accessed by customers over a computer network, the display further arranged to display a graphical representation comprising a graphical web site map of a merchant.

13. A method of data visualisation of claim 2, wherein the display means is further arranged to display an area map showing the origin of customers in merchant customer interactions.

14. A method of data visualisation of claim 1, further comprising:
    maintaining in a memory a sports database of data representing one or more sports events;
    retrieving from the sports database data representing a sports event;
    constructing the finite set of data values from the retrieved data; and
    storing the data values in the data value memory.

15. A method of data visualisation of claim 14, further comprising:
    displaying a graphical representation of a sports venue at which the sports event is held; and
    superimposing the contoured representation of the data values on the graphical representation of the sports venue.

16. A method of data visualisation comprising:
    accessing a finite set of data values;
    displaying a representation of each data value centered on respective data points; and
    generating and displaying a representation having a cross-sectional shape of a bell-shaped curve using a processor such that each data point is displayed as an apex of the bell-shaped curve.

17. A method of data visualisation of claim 16, further comprising:
    maintaining in a memory an interaction database of interaction data representing interactions between customers and merchants;
    retrieving from the interaction database data representing interactions between customers and merchants;
    constructing the finite set of data values from the retrieved data using a processor; and
    storing the data values in the data value memory.

18. A data visualisation system comprising:
    a data value memory in which is maintained a finite set of data values;

a display arranged to display a representation of each data value centered on respective data points; and a contour generator arranged to generate and display a representation having a cross-sectional shape of a bell-shaped curve in which each data point is displayed as an apex of the bell-shaped curve.

19. A data visualisation system as claimed in claim 18, further comprising a memory in which is maintained an interaction database of interaction data representing interactions between customers and merchants; and a retrieval device arranged to retrieve from the interaction database data representing interactions between customers and merchants, to construct the finite set of data values from the retrieved data and to store the data values in the data value memory.

20. A data visualisation system as claimed in claim 19, wherein the merchant operates from one or more commercial premises, the display further arranged to display a graphical spatial representation of the premises of the merchant.

21. A data visualisation system as claimed in claim 20, wherein the merchant sells a range of products to customers, each product having a product code, the interaction data comprising a product code for each interaction.

22. A data visualisation system as claimed in claim 20, wherein the merchant operates a casino or gaming venue comprising one or more stations, each station having a station identifier, the interaction data comprising a station identifier for each interaction.

23. A data visualisation system as claimed in claim 20, wherein the merchant comprises a wagering or betting service provider, the interaction data comprising a merchant identifier and a monetary value for each interaction.

24. A data visualisation system as claimed in claim 20, wherein the merchant comprises a financial or insurance services provider comprising one or more business units, each business unit having a business unit identifier, the interaction data comprising a business unit identifier for each interaction.

25. A data visualisation system as claimed in claim 20, wherein the merchant provides reservation of products or services, the interaction data comprising a merchant identifier and the time of the interaction for each interaction.

26. A data visualisation system as claimed in claim 18, further comprising:

a memory in which is maintained a manufacturing process database of data representing one or more manufacturing processes; and a retrieval device arranged to retrieve from the manufacturing process database data representing a manufacturing process, to construct the finite set of data values from the retrieved data and to store the data values in the data value memory.

27. A data visualisation system as claimed in claim 26, wherein the manufacturing process comprises one or more manufacturing stages, each stage having a stage identifier, the interaction data comprising a stage identifier for each interaction.

28. A data visualisation system as claimed in claim 19, wherein the merchant comprises a telecommunications service provider operating a telecommunications network, the display further arranged to display a graphical spatial representation of a network or part of a network operated by a merchant.

29. A data visualisation system as claimed in claim 19, wherein the merchant operates from one or more web sites which are accessed by customers over a computer network, the display further arranged to display a graphical representation comprising a graphical web site map of a merchant.

30. A data visualisation system as claimed in claim 19, wherein the display is further arranged to display an area map showing the origin of customers in merchant customer interactions.

31. A data visualisation system as claimed in claim 18, further comprising a memory in which is maintained a sports database of data representing one or more sports events; and a retrieval device arranged to retrieve from the sports database data representing a sports event, to construct the finite set of data values from the retrieved data and to store the data values in the data value memory.

32. A data visualisation system as claimed in claim 31, wherein the display is further arranged to display a graphical representation of a sports venue at which the sports event is held and to superimpose the contoured representation of the data values on the graphical representation of the sports venue.

* * * * *

UNITED STATES PATENT AND TRADEMARK OFFICE
CERTIFICATE OF CORRECTION

| | | |
|---|---|---|
| PATENT NO. | : 8,340,980 B2 | Page 1 of 1 |
| APPLICATION NO. | : 13/447031 | |
| DATED | : December 25, 2012 | |
| INVENTOR(S) | : Andrew John Cardno et al. | |

It is certified that error appears in the above-identified patent and that said Letters Patent is hereby corrected as shown below:

In the Specifications:

Column 2, In line 28, add "S" to "DRAWING"

Column 3, In line 30, insert --,-- after "20B"

Column 11, In line 35, remove "," after "The"

Column 11, In line 42, insert --or-- after "individual,"

Column 12, In line 28, change "premises" to --premise--

Column 13, In line 16, change "premises" to --premise--

Column 13, In line 37, change "par" to --bar--

Column 15, In line 22, change "'weekly" to --"weekly--

Column 16, In line 38, remove "." after "insurance"

Column 16, In line 64, remove "." before "the"

Column 18, In line 2, change "Shown" to --shown--

Signed and Sealed this
Twenty-eighth Day of May, 2013

Teresa Stanek Rea
*Acting Director of the United States Patent and Trademark Office*